US010144444B2

(12) United States Patent
Sawai et al.

(10) Patent No.: US 10,144,444 B2
(45) Date of Patent: Dec. 4, 2018

(54) SNOWMOBILE

(71) Applicant: Yamaha Hatsudoki Kabushiki Kaisha, Shizuoka-ken (JP)

(72) Inventors: Seiji Sawai, Shizuoka (JP); Takashi Imamura, Shizuoka (JP); Atsushi Yasuda, Shizuoka (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 25 days.

(21) Appl. No.: 15/422,486

(22) Filed: Feb. 2, 2017

(65) Prior Publication Data

US 2017/0217472 A1  Aug. 3, 2017

(30) Foreign Application Priority Data

Feb. 2, 2016  (JP) ................................. 2016-018165

(51) Int. Cl.
*B62B 17/04* (2006.01)
*B62B 13/08* (2006.01)
*B62M 27/02* (2006.01)

(52) U.S. Cl.
CPC .............. *B62B 17/04* (2013.01); *B62B 13/08* (2013.01); *B62M 27/02* (2013.01); *B62M 2027/023* (2013.01); *B62M 2027/025* (2013.01); *B62M 2027/026* (2013.01)

(58) Field of Classification Search
CPC ............. B62B 17/04; B62M 2027/025; B62M 2027/026
See application file for complete search history.

(56) References Cited

U.S. PATENT DOCUMENTS

| 4,593,921 A | * | 6/1986 | Marier | B62B 17/04 |
| | | | | 280/124.127 |
| 5,486,018 A | | 1/1996 | Sakai | |
| 6,899,191 B1 | * | 5/2005 | Lykken | B62M 27/02 |
| | | | | 180/182 |

(Continued)

FOREIGN PATENT DOCUMENTS

| JP | S61-238564 A | 10/1986 |
| JP | H08-132846 A | 5/1996 |

(Continued)

OTHER PUBLICATIONS

Machine translation of JP 2007-055507 A (Year: 2007).*

(Continued)

*Primary Examiner* — Kevin Hurley
(74) *Attorney, Agent, or Firm* — HEA Law PLLC

(57) ABSTRACT

This specification relates to a snowmobile. Each of the right suspension and the left suspension includes a damper capable of expanding and contracting according to the vertical movement of the lower arm and a spring that exerts spring force in the expansion/contraction direction of the damper. The cylinder of the right damper and the cylinder of the left damper are connected to each other through a hydraulic fluid channel so that the hydraulic fluid flows between the cylinder of the right damper and the cylinder of the left damper. This snowmobile can reduce the difference in contact pressure on snow surface between the left ski and the right ski, when the vehicle turns.

23 Claims, 17 Drawing Sheets

(56) References Cited

U.S. PATENT DOCUMENTS

| | | | | |
|---|---|---|---|---|
| 8,408,560 | B2* | 4/2013 | Kamioka | B62B 17/062 |
| | | | | 180/190 |
| 8,827,291 | B2* | 9/2014 | Cronquist | B62B 17/04 |
| | | | | 180/190 |
| 9,022,155 | B2* | 5/2015 | Girouard | B62M 27/02 |
| | | | | 180/191 |
| 2011/0121524 | A1 | 5/2011 | Kamioka et al. | |
| 2012/0112424 | A1 | 5/2012 | Cronquist et al. | |
| 2017/0321729 | A1* | 11/2017 | Melcher | F15B 13/044 |

FOREIGN PATENT DOCUMENTS

| | | | |
|---|---|---|---|
| JP | 3386852 B2 | | 3/2003 |
| JP | 3391487 B2 | | 3/2003 |
| JP | 2007055507 A | * | 3/2007 |
| WO | 2016/147677 A1 | | 9/2016 |

OTHER PUBLICATIONS

English abstract for WO2016/147677A1 provided from EPO.
Office Action dated Feb. 16, 2018, for corresponding CA Patent Application No. 2,956,616.

* cited by examiner

SNOWMOBILE

CROSS-REFERENCE TO RELATED APPLICATION

The present application claims priority from Japanese application JP2016-018165 filed on Feb. 2, 2016, the entire content of which is hereby incorporated by reference into this application.

BACKGROUND OF THE INVENTION

Field of the Invention

The present specification relates to suspensions provided in a snowmobile.

Description of the Related Art

Snowmobiles include skis disposed on the right and left sides of the vehicle frame and supported by arms connected to the vehicle frame so that the skis are can move up and down. Suspensions are connected to the vehicle frame and the arms. Each of the right and left suspensions includes a spring structure and a damper, and is expandable and contractible according to the vertical movement of the arm. When the vehicle body is going to incline toward the lateral side during turning or just before turning, the damper moderates the movement of the vehicle body and thus contributes to a comfortable ride. In most of conventional snowmobiles, the left and right suspensions are structurally independent of each other.

Japanese Patent Laid-Open No. 61-238564 (hereinafter referred to as Patent Document 1) and US Patent Application Publication No. 2012/0112424 (hereinafter referred to as Patent Document 2) disclose snowmobiles including air springs respectively provided in left and right suspensions. Unlike in the conventional snowmobiles described above, in the snowmobiles disclosed in Patent Documents 1 and 2, the left and right air springs are directly or indirectly connected to each other.

In the snowmobile of Patent Document 1, the air chamber 17 of the air spring forming the left suspension and the air chamber 17 of the air spring forming the right suspension are each connected to an air reservoir 20 via an air passage 21. When the vehicle turns, a valve 22 in the air passage 21 connected to the outer air spring is closed, which allows the outer air spring to exert sufficient spring force.

In the snowmobile of Patent Document 2, the air chambers formed in the left and right air springs 58O and 58I are connected to each other via pipes 70O and 70I. When the snowmobile slides laterally on a slope as shown in FIG. 2 of Patent Document 2, air flows from the air chamber of one air spring to the air chamber of the other air spring via the pipes 70O and 70I. This allows the driver to easily tilt the vehicle body when the snowmobile slides on a slope.

SUMMARY OF THE INVENTION

As described above, when the vehicle body is going to incline toward the lateral side during turning or just before the turning, the damper moderates the movement of the vehicle body and thus contributes to a comfortable ride. In order to further improve the ride quality of the vehicle, in one embodiment, the left and right skis are pressed on the snow's surface with an even pressure. However, during turning, a larger load acts on the outer ski than the inner ski. For example, when a vehicle turns to the right, a larger load acts on the left ski than on the right ski. That is, during turning of conventional snowmobiles, in which the left and right suspensions are structurally independent from each other, a difference in contact pressure on the snow's surface occurs between the left ski and the right ski.

In Patent Document 1, each of the left and right air chambers 17 is connected to the air reservoir 20. That is, the left and right air chambers 17 are indirectly connected to each other. However, when the snowmobile of Patent Document 1 turns, air flow to increase the contact pressure between the inner ski and the snow's surface does not occur between the two air springs. Therefore, the snowmobile of Patent Document 1 also causes a difference in contact pressure on the snow's surface between the left ski and the right ski during turning.

In Patent Document 2 described above, the air chambers forming the left and right air springs 58O and 58I are connected to each other via pipes 70O and 70I, and thus air is allowed to move between the two air chambers. However, the vehicle of Patent Document 2 can be improved, with respect to ride comfort. Specifically, when the vehicle body tilts when turning, air moves between the air chambers forming the left and right air springs 58O and 58I, and thus the air springs 58O, 58I can not exert a sufficient spring force. Accordingly, returning the posture of the vehicle body to its original posture (that is, a horizontal posture) takes too long after turning.

One object of the present specification is to provide a snowmobile that can reduce the difference in contact pressure on the snow's surface between the right ski and the left ski, and easily return the vehicle body to its original posture after tilting.

(1) A snowmobile according to an embodiment described in the present specification includes: a right ski; a left ski; a first right arm supporting the right ski and vertically movable relative to a vehicle body; a first left arm supporting the left ski and vertically movable relative to the vehicle body; a right suspension including a right damper and a right spring, the right damper being expandable and contractible according to the vertical movement of the first right arm, the right spring being configured to exert a spring force in an expansion/contraction direction of the right damper, the right damper including a cylinder filled with hydraulic fluid and a piston that moves inside the cylinder; a left suspension including a left damper and a left spring, the left damper being expandable and contractible according to the vertical movement of the first left arm, the left spring being configured to exert a spring force in an expansion/contraction direction of the left damper, the left damper including a cylinder filled with hydraulic fluid and a piston that moves inside the cylinder; and a hydraulic fluid channel connected to the cylinders of the right damper and the left damper so that the hydraulic fluid flows between the cylinders of the right and left dampers.

When the above described snowmobile turns, the hydraulic fluid flows from the hydraulic fluid chamber of the cylinder of the outer damper to the hydraulic fluid chamber of the cylinder of the inner damper. As a result, a force acts on and extends the inner damper. For example, when the snowmobile turns to the right, the hydraulic fluid flows from the left damper to the right damper, and as a result, a force acts on and extends the right damper. This can reduce the difference in contact pressure on the snow's surface between the left ski and the right ski during turning, and thus contributes improvement to the ride comfort. Further, unlike US Patent Application Publication No. 2012/0112424, after the vehicle body tilts, driver can easily return the vehicle body to its original posture by utilizing a spring force exerted from the spring.

(2) The snowmobile described in (1) may further include an intermediate unit including a cylinder, the cylinder including a hydraulic fluid chamber, a gas chamber, and a piston partitioning the inside of the cylinder into the hydraulic fluid chamber and the gas chamber, wherein the hydraulic fluid channel may include a first channel connecting the cylinder of the right damper and the cylinder of the intermediate unit and may include a second channel connecting the cylinder of the left damper and the cylinder of the intermediate unit. According to this embodiment, for example, when the left and right skis move upward at the same time, the hydraulic fluid flows from both the left and right dampers into the cylinder of the intermediate unit, and the piston of the intermediate unit then contracts the gas chamber of the intermediate unit. Conversely, when both the left and right skis move downward at the same time, the hydraulic fluid flows out from the intermediate unit to both the cylinders of the left and right dampers, and the gas chamber of the intermediate unit then expands. That is, when both the left and right skis move up and down at the same time, the gas in the gas chamber absorbs the movements of the skis by compression and expansion of the gas chamber. When the vehicle turns, the hydraulic fluid flows from the outer damper to the inner damper through the hydraulic fluid chamber of the intermediate unit. This can reduce the difference in contact pressure on snow surface between the right ski and the left ski.

(3) In the snowmobile described in (2), the first and second channels may be separately connected to the cylinder of the intermediate unit.

(4) In the snowmobile described in (2), the first and second channels may be connected to the cylinder of the intermediate unit through a common channel.

(5) In the snowmobile described in (2), a throttle valve may be provided in a channel, where the channel includes the first and second channels, and connects the cylinder of the right damper and the cylinder of the left damper via the hydraulic fluid chamber of the intermediate unit. According to this embodiment, for example, when the vehicle body rolls, that is, when the vehicle body sways around the axis along the front-back direction of the vehicle body, damping obtained from the left and right damper and damping obtained from the throttle valve can be utilized to stabilize the vehicle body.

(6) In the snowmobile described in (2), no throttle valve may be provided in a channel, where the channel includes the first and second channels, and connects the cylinder of the right damper and the cylinder of the left damper via the hydraulic fluid chamber of the intermediate unit. This embodiment can allow the hydraulic fluid to smoothly flow between the right damper and the left damper.

(7) In the snowmobile described in (2), the hydraulic fluid channel may include a bypass channel connecting the first channel and the second channel and bypassing the hydraulic fluid chamber of the intermediate unit. This embodiment can accelerate the flow of the hydraulic fluid between the right damper and the left damper.

(8) In the snowmobile described in (7), the hydraulic fluid channel may include a valve for opening and closing the bypass channel. This embodiment allows switching between the flow through the bypass channel and the flow through the cylinder of the intermediate unit.

(9) In the snowmobile described in (7), a throttle valve may be provided in a channel, where the channel includes the first and second channels and connects the cylinder of the right damper and the cylinder of the left damper via the hydraulic fluid chamber of the intermediate unit. Further, the first channel may have a first position that is located away from the throttle valve toward the cylinder of the right damper, the second channel may have a second position that is located away from the throttle valve toward the cylinder of the left damper. The bypass channel may connect the first position and the second position.

(10) The snowmobile described in (2) may further include a seat for a driver to sit, wherein the intermediate unit may be positioned further forward than the front end of the seat in a side view of the vehicle body. This arrangement of the intermediate unit can reduce the distance between the right and left dampers and the intermediate damper and then can suppress the first channel and second channel from becoming excessively long.

(11) The snowmobile described in (2) may further include a steering handle, and a steering column connected to the steering handle for steering the right ski and the left ski, where at least a portion of the intermediate unit may be positioned further forward than the steering column in a side view of the vehicle body. This arrangement of the intermediate unit can reduce the distance between the right and left dampers and the intermediate damper and then can prevent the first channel and second channel from becoming excessively long.

(12) In the snowmobile described in (2), the intermediate unit may be arranged such that the cylinder of the intermediate unit has an axis inclined relative to a horizontal plane. This arrangement of the intermediate unit can reduce a space required for arranging the intermediate unit in the front/back direction.

(13) The snowmobile described in (2) may further include an engine, wherein at least a portion of the intermediate unit may be positioned further forward than the engine in a side view of the vehicle body. This arrangement of the intermediate unit can reduce distance between the right and left dampers and the intermediate damper and then can prevent the first and second channels from becoming excessively long.

(14) The snowmobile described in (2) may further include an engine, wherein at least a portion of the intermediate unit may be positioned higher than an upper end of the engine in a side view of the vehicle body. This arrangement of the intermediate unit can reduce the distance between the steering handle and the intermediate unit and then can facilitate an operation by a driver for the intermediate unit.

(15) In the snowmobile described in (2), the intermediate unit may intersect a vertical line passing through a center in the lateral direction of the vehicle body in a front view of the vehicle body. This arrangement of the intermediate unit can reduce the difference between the length of the first channel and the length of the second channel.

(16) In the snowmobile described in (2), the first channel and the second channel may have substantially the same length.

(17) The snowmobile described in (2) may further include a second right arm disposed above the first right arm and supporting the right ski, and a second left arm disposed above the first left arm and supporting the left ski, wherein the hydraulic fluid channel may be connected to the cylinder of the right damper at a position higher than the second right arm, and the hydraulic fluid channel may be connected to the cylinder of the left damper at a position higher than the second left arm. This structure can facilitate installation of the hydraulic fluid channel (e.g., pipes) when manufacturing of the snowmobile, compared to a structure in which hydraulic fluid channels are connected to the cylinders at a position lower than the second arms.

(18) In the snowmobile described in (1), at least one of the hydraulic fluid channel and the intermediate unit may include an adjusting device that adjusts the flow of the hydraulic fluid.

(19) In the snowmobile described in (18), the adjusting device may include an operation part for an operator to operate, and the operation part may be exposed outside the vehicle body. This structure allows the driver to easily access the operation part.

(20) In the snowmobile described in (18), the adjusting device may include an operation part for an operator to operate, and the operation part may be disposed in a vicinity of a steering handle. This structure allows the driver to easily access the operation part.

(21) In the snowmobile described in (18), the adjusting device may include an operation part for an operator to operate, and the operation part may be disposed between a steering column and an indicator. This structure allows the driver to easily access the operation part.

(22) In the snowmobile described in (18), the hydraulic fluid channel may include a pipe having the adjusting device on a midway portion of the pipe, and the pipe may be clamped in a vicinity of a steering column.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, operations, elements, and/or components, but do not preclude the presence or addition of one or more other features, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and are disclosed. Each of these has individual benefit and each can also be used in conjunction with one or more, or in some cases all, of the other disclosed techniques. Accordingly, for the sake of clarity, this description will refrain from repeating every possible combination of the individual techniques in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

Figure 1:
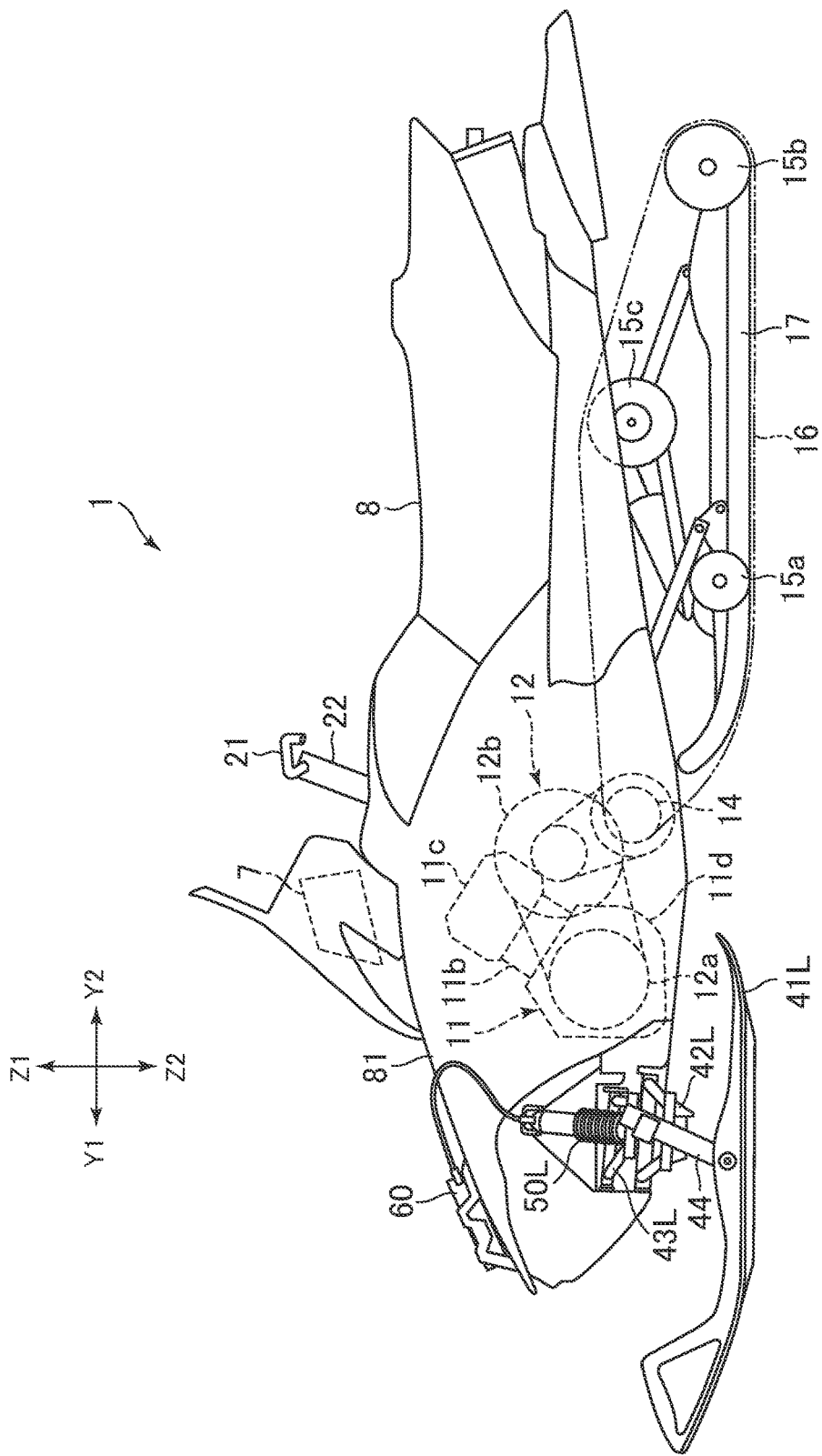
FIG. 1 is a side view of an exemplary snowmobile of embodiments according to the present invention.
Figure 2:
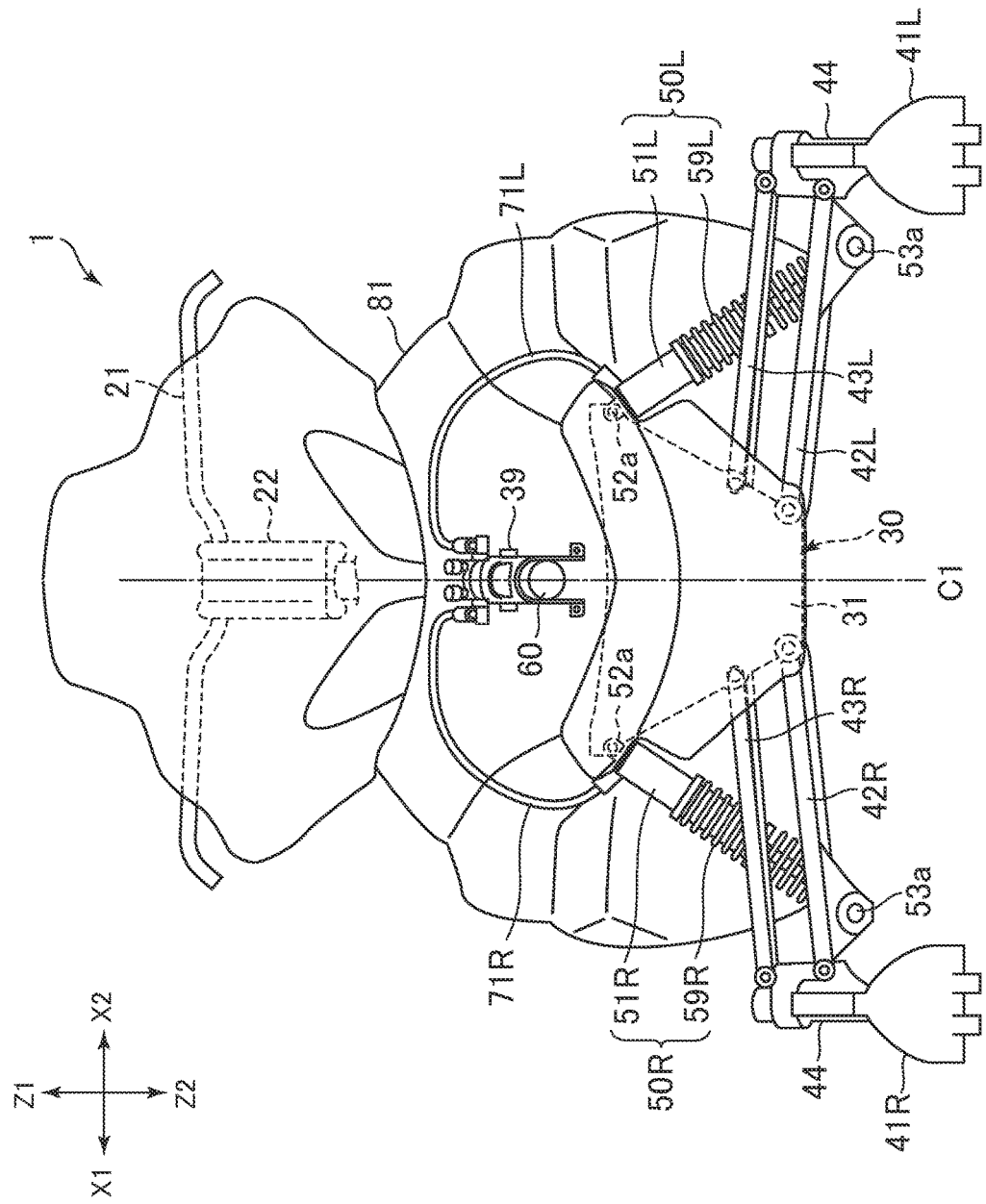
FIG. 2 is a front view of the snowmobile shown in FIG. 1.
Figure 3:
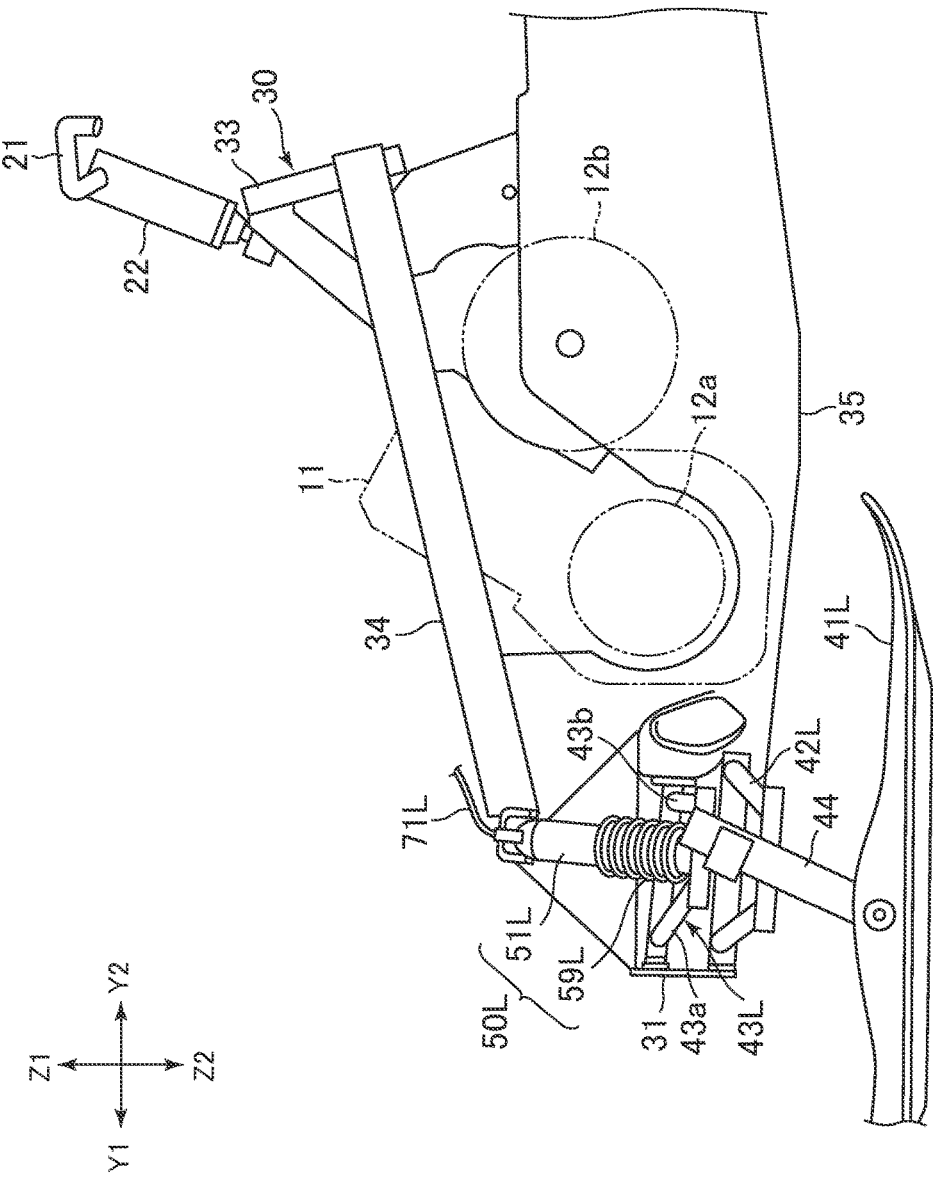
FIG. 3 is a side view of the vehicle frame and a support structure for supporting the skis that are provided to the snowmobile shown in FIG. 1.
Figure 4:
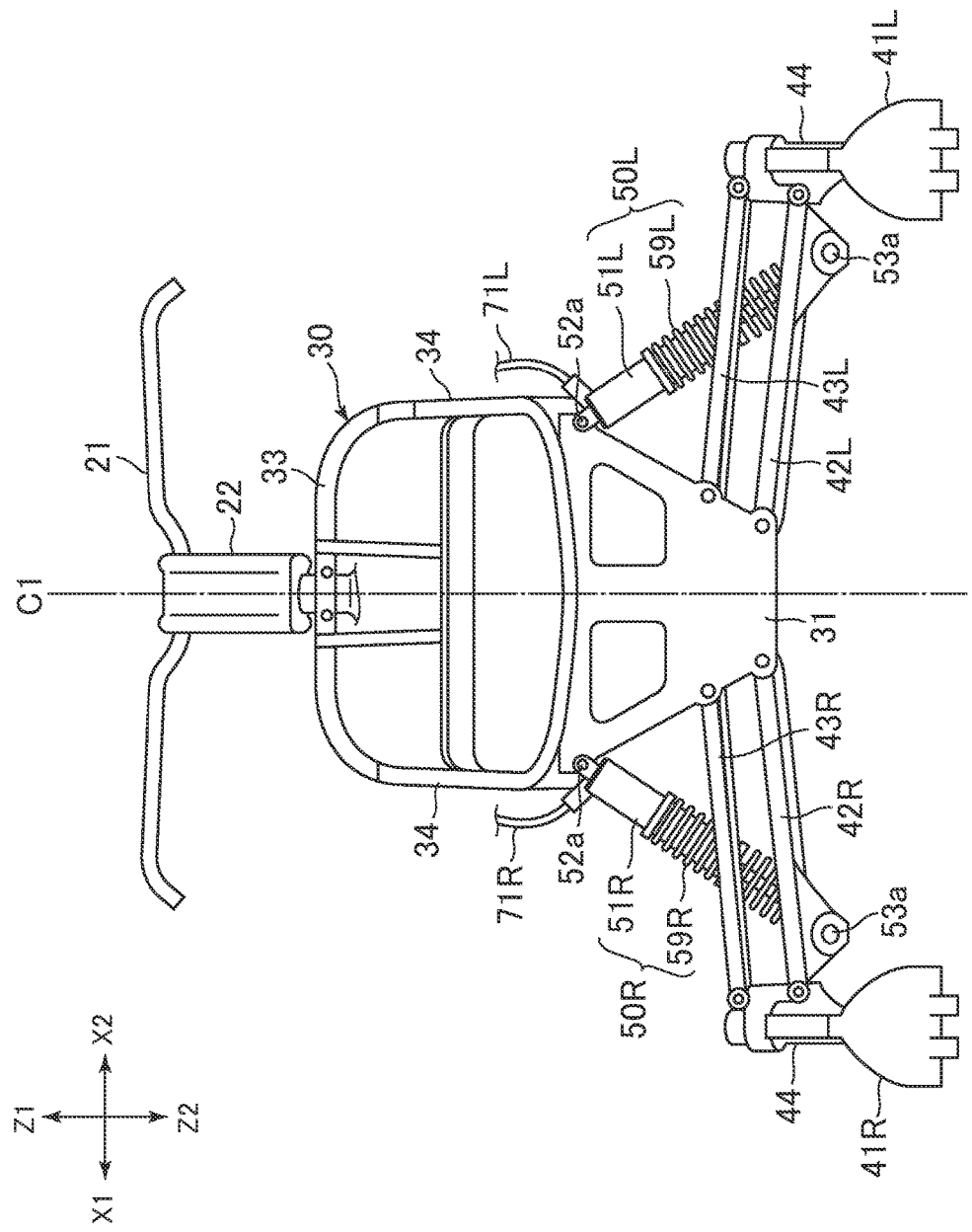
FIG. 4 is a front view of the vehicle frame and the support structure for supporting the skis that are provided to the snowmobile shown in FIG. 1.
Figure 5:
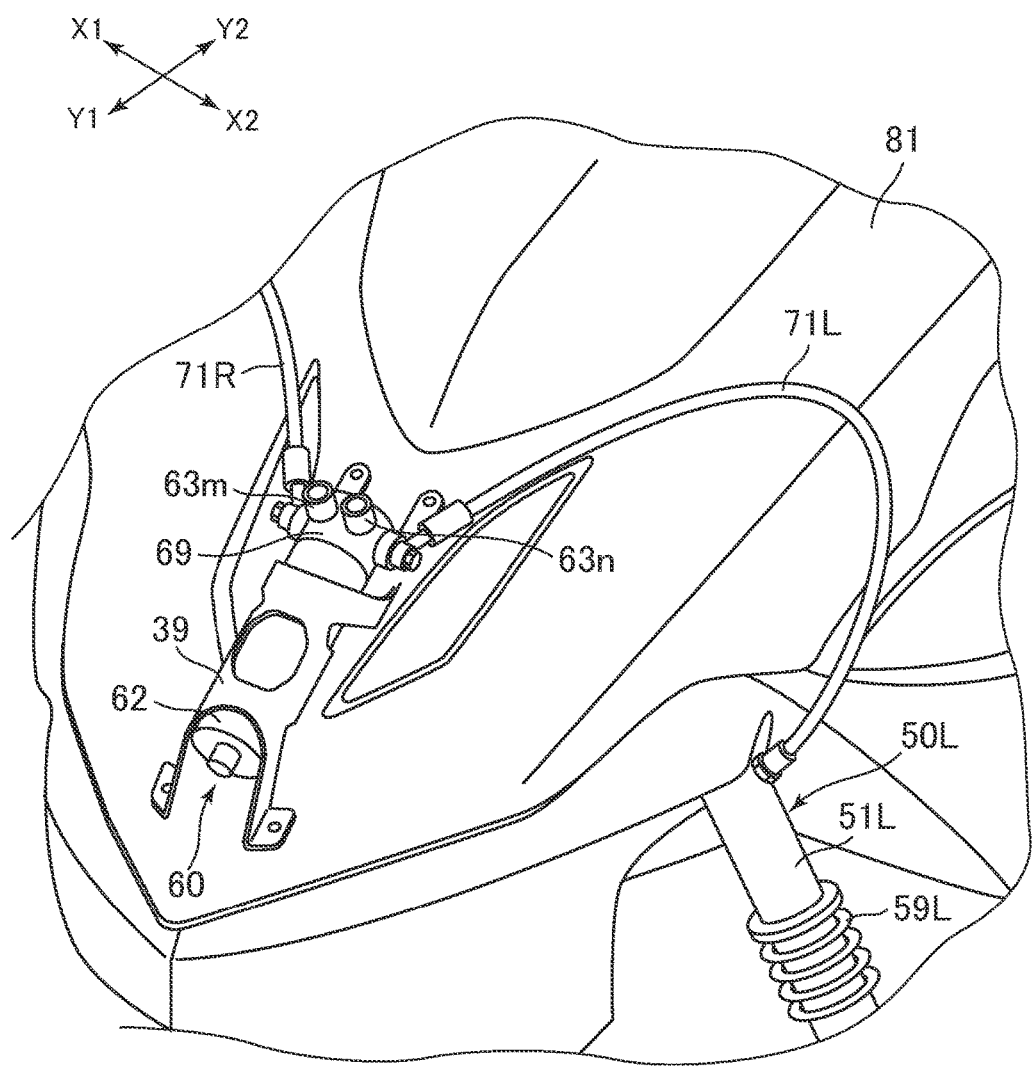
FIG. 5 is a perspective view of an area in which the intermediate unit is located.
Figure 6A:
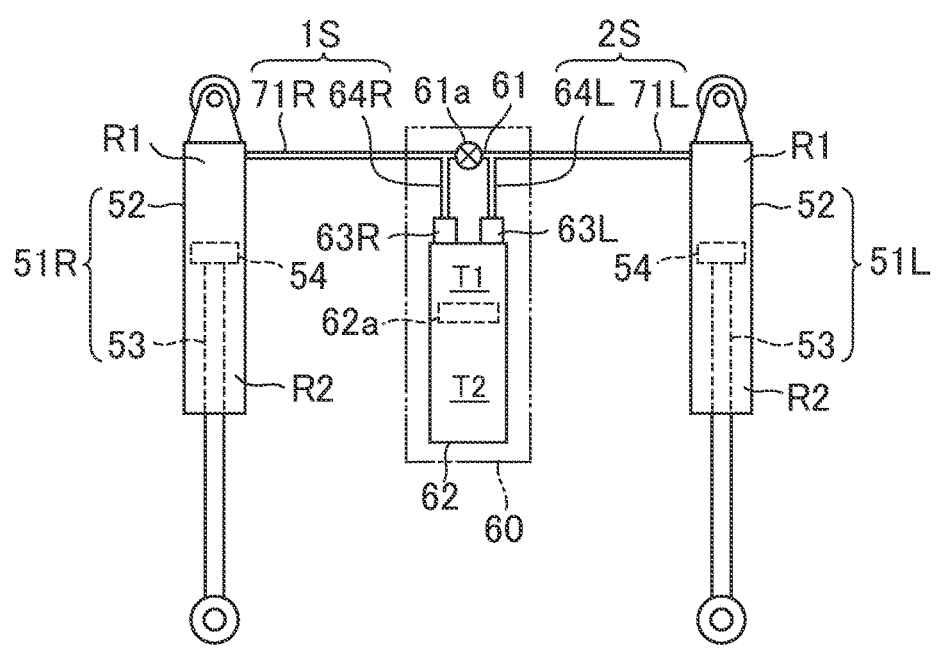
FIG. 6A schematically shows the right and left dampers and shows a hydraulic fluid channel connecting the right and left dampers.
Figure 6B:
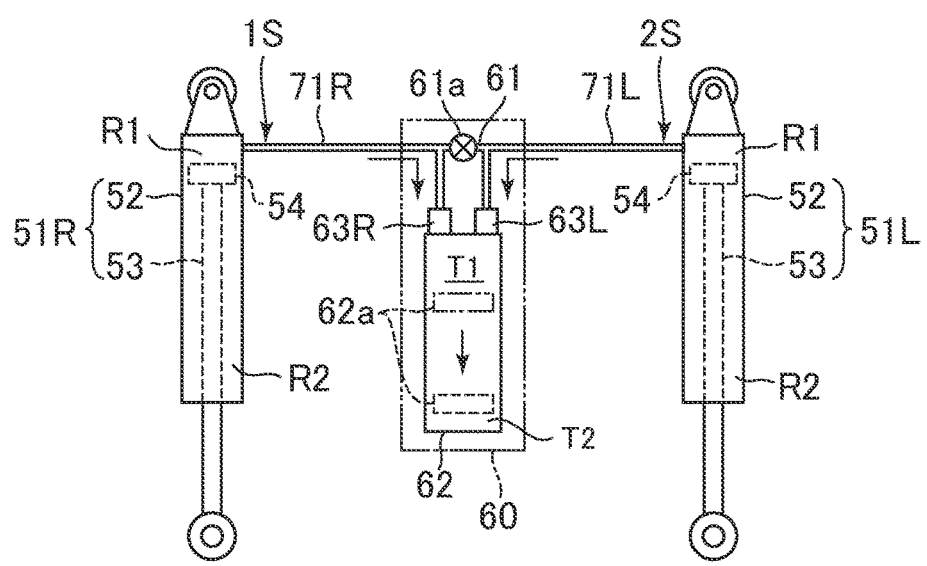
FIG. 6B illustrates an exemplary function of an intermediate cylinder provided on the hydraulic fluid channel and the left and right dampers.
Figure 6C:
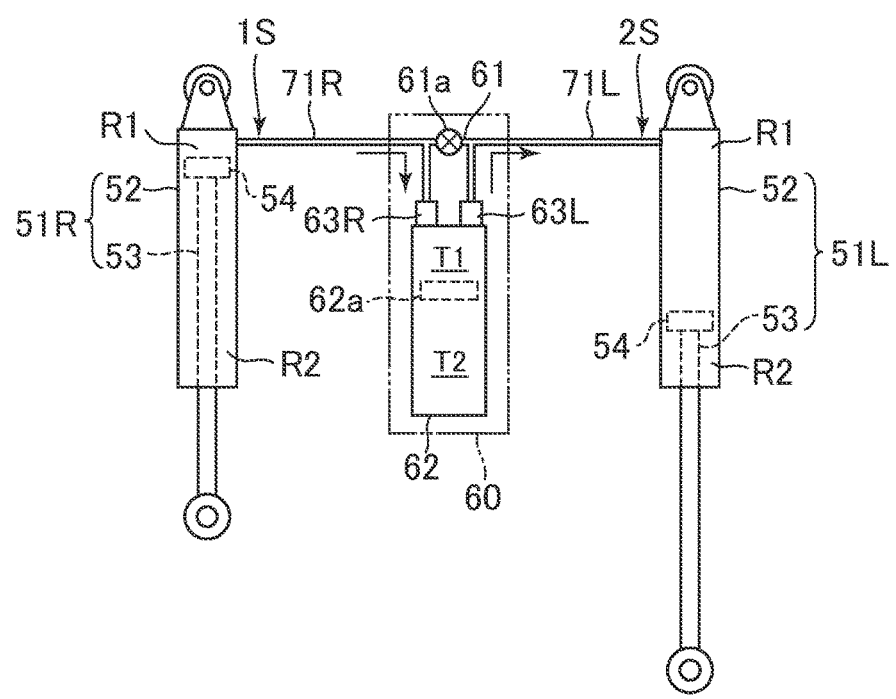
FIG. 6C illustrates another exemplary function of the intermediate cylinder provided on the hydraulic fluid channel and the left and right dampers.
Figure 7:
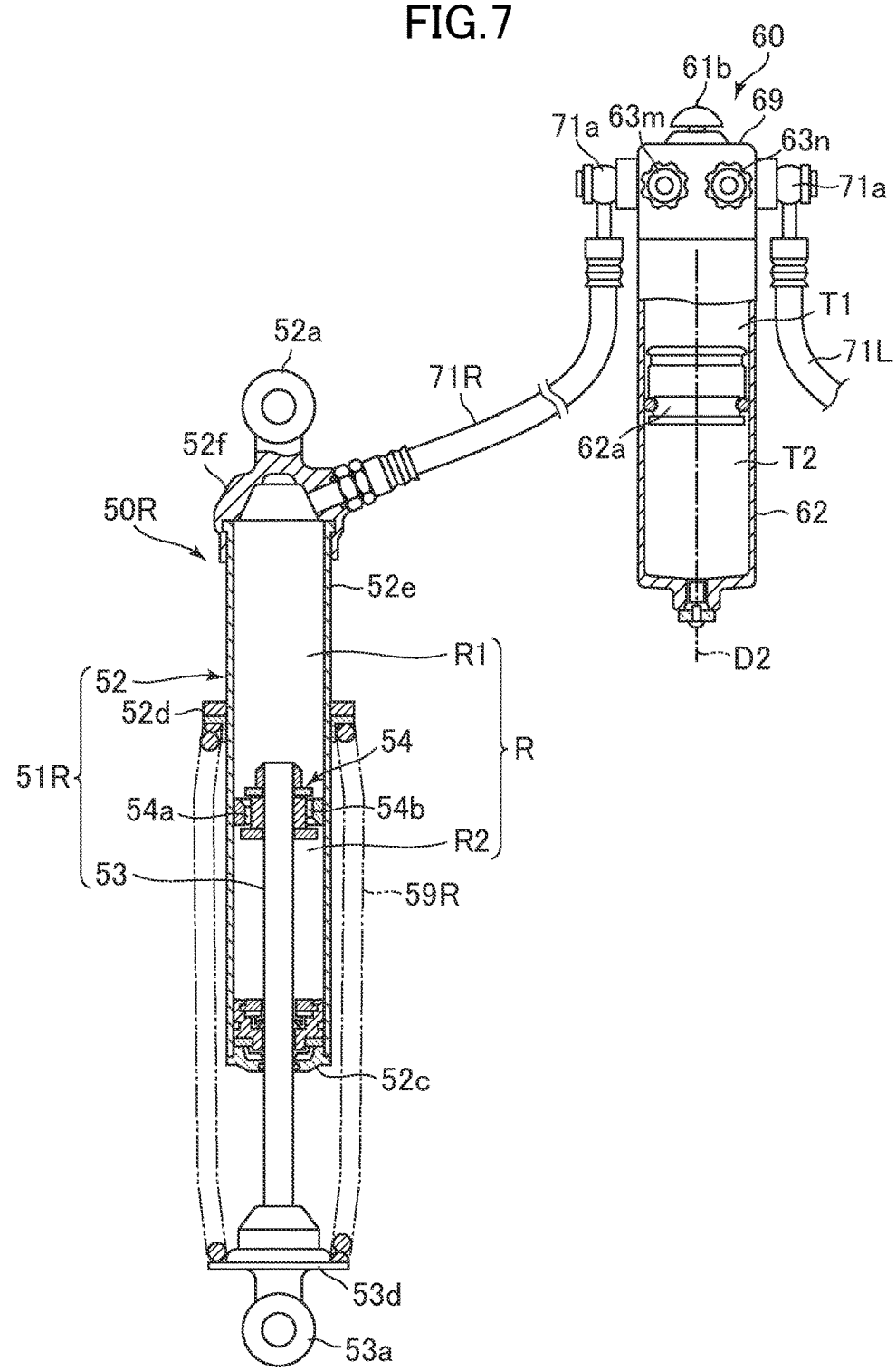
FIG. 7 shows the structure of the damper and the intermediate unit.

The present invention will now be described by referencing the appended figures representing embodiments. FIG. 1 is a side view of an exemplary snowmobile 1 of embodiments according to the present invention. FIG. 2 is a front view of the snowmobile 1. FIG. 3 is a side view of the vehicle frame 30 and a support structure for supporting the skis 41R and 41L of snowmobile 1. FIG. 4 is a front view of the vehicle frame 30 and the support structure for supporting the skis 41R and 41L of snowmobile 1. FIG. 5 is a perspective view of an area in which an intermediate unit 60 is located. FIGS. 6A, 6B and 6C show the right and left dampers 51R and 51L, and show a hydraulic fluid channel connecting the right and left dampers 51R and 51L. FIG. 7 shows the structure of the damper 51L and the intermediate unit 60.

In the following description, Y1 and Y2 illustrated in the above-described drawings, indicate forward and rearward directions, respectively. Further, Z1 and Z2 indicate upward and downward directions, respectively. X1 and X2 indicate rightward and leftward directions, respectively.

As shown in FIG. 2, the snowmobile 1 includes a right ski 41R located rearward from the vehicle frame 30 and a left ski 41L located leftward from the vehicle frame 30. The right ski 41R is supported by a lower arm 42R and an upper arm 43R. Likewise, the left ski 41L is supported by a lower arm 42L and an upper arm 43L. The right arms 42R and 43R extend rightward from the proximal portions thereof connected to the vehicle frame 30 and include distal ends connected to the knuckle 44. The right ski 41R is connected to the lower end of the knuckle 44. The left arms 42L and 43L extend leftward from the proximal portions thereof connected to the vehicle frame 30, and include distal ends connected to a knuckle 44 to which the left ski 41L is connected. The proximal portions of the arms 42R, 43R, 42L, and 43L are rotatably connected to the vehicle frame 30 so that the skis 41R and 41L can move up and down relative to the vehicle frame 30.

As shown in FIG. 2, the snowmobile 1 includes a right suspension 50R and a left suspension 50L. The suspensions 50R and 50L include dampers 51R and 51L respectively (hereinafter, the damper 51R of the right suspension 50R is referred as a right damper, and the damper 51L of the left suspension 50L is referred as a left damper). The upper end 52a (see FIG. 7) of the right damper 51R is connected to the vehicle frame 30 and the lower end 53a (see FIG. 7) of the right damper 51R is connected to the lower arm 42R. The damper 51R can expand and contract according to the vertical movement of the lower arm 42R. The right suspension 50R further includes a spring 59R that exerts a spring force in the expansion/contraction direction of the damper 51R. The left suspension 50L has the same structure as that of the right suspension 50R. Specifically, the upper end 52a of the left damper 51L is connected to the vehicle frame 30, and the lower end 53a of the left damper 51L is connected to the lower arm 42L. The left damper 51L can expand and contract according to the vertical movement of the lower arm 42L. The left suspension 50L includes a spring 59L that exerts spring force in the expansion/contraction direction of the damper 51L. The suspensions 50R and 50L are located between the front rod 43a and the rear rod 43b constituting the upper arm 43R, 43L (see FIG. 3).

As shown in FIG. 6A, the snowmobile 1 includes a hydraulic fluid channel connecting the right damper 51R and the left damper 51L. In the example of snowmobile 1, the right damper 51R and the left damper 51L are connected to each other via an intermediate cylinder 62 and first pipes 71R and 71L constituting the hydraulic fluid channel. The pipes 71R and 71L are, for example, a flexible hose. The hydraulic fluid channel and the intermediate cylinder 62 will be described in detail later.

As shown in FIG. 1, the drive system of the snowmobile 1 includes an engine 11 and a transmission 12. The engine 11 includes a crankcase 11d accommodating a crankshaft (not shown), a cylinder block 11b fixed to the crankcase 11d, and a cylinder head 11c fixed to the cylinder block 11b. The cylinder block 11b has a cylinder formed therein. The cylinder head 11c has an intake passage and an exhaust passage formed therein that are connected to the combustion chamber of the cylinder. The crankcase 11d is located further rearward than the arms 42R, 43R, 42L, and 43L supporting the skis 41R and 41L in a side view of the vehicle body. The cylinder block 11b and the cylinder head 11c are fixed on the upper side of the crankcase 11d, and arranged such that the axis line of the cylinder is inclined rearward. The arrangement of the engine 11 is not limited to the example of snowmobile 1.

The transmission 12 is, for example, a continuously variable transmission. Accordingly, as shown in FIG. 1, the transmission 12 includes a drive pulley 12a receiving torque from the crankshaft and a driven pulley 12b receiving torque from the drive pulley 12a. A belt is wound around the pulleys 12a and 12b to transmit the torque from the drive pulley 12a to the driven pulley 12b. The drive pulley 12a is mounted, for example, on the end of the crankshaft. The driven pulley 12b is mounted, for example, on a secondary shaft (not shown) positioned further rearward than the crankshaft and higher than the crankshaft. The transmission 12 is not necessarily a continuously variable transmission. For example, the transmission 12 may be of a gear type including gears corresponding to a plurality of shift speeds.

As shown in FIG. 1, the snowmobile 1 includes a track belt drive shaft 14 having a sprocket mounted on the shaft 14 and engaging with the track belt 16. The track belt drive shaft 14 is connected to the secondary shaft via a belt, a chain, or the like, and receives torque from the engine 11 through the transmission 12. Guide wheels 15a, 15b, and 15c for guiding the track belt 16 and a slide rail 17 for guiding the track belt 16 are located inside the track belt 16. The slide rail 17 presses the track belt 16 on the snow's surface.

The snowmobile 1 includes a seat 8 for a driver to sit on. As shown in FIG. 1, the seat 8 is located above the track belt 16. A steering handle 21 for steering the skis 41R and 41L is located frontward from the seat 8. The steering handle 21 is fixed to the upper portion of a steering column 22. The steering column 22 extends diagonally downward and forward from the central portion of the steering handle 21. The steering handle 21 links with the skis 41R and 41L through the steering column 22 and a tie rod (not shown). In the example of snowmobile 1, the steering handle 21 and the steering column 22 are located further rearward than the engine 11. The layout of the steering handle 21 and the steering column 22 is not limited to the example of snowmobile 1. For example, the steering handle 21 and the steering column 22 may be located above the engine 11.

The snowmobile 1 includes an indicator 7 for indicating state of the vehicle such as the vehicle speed and the engine speed. The indicator 7 is located forward from the steering handle 21 and the steering column 22 as shown in FIG. 1.

As shown in FIGS. 3 and 4, the vehicle frame 30 includes, in the foremost portion thereof, a ski support frame 31 to which the proximal portions of the arms 42R, 42L, 43R, and 43L are connected. In the example of snowmobile 1, the vehicle frame 30 includes a column support portion 33 that supports the steering column 22, an engine support frame 35 that supports the engine 11, and a side frame 34 that extends rearward from the ski support frame 31 to the column support portion 33. The structure of the vehicle frame 30 is not limited to the example of snowmobile 1 and may be modified.

As described above, the snowmobile 1 includes the right suspension 50R and the left suspension 50L. As shown in FIG. 7, the damper 51R of the right suspension 50R includes a cylinder 52 having a hydraulic fluid chamber R filled with hydraulic fluid, and includes a piston rod 53. The piston rod 53 has a piston 54 fixed to the end of the piston rod 53 and located inside the hydraulic fluid chamber R. The left suspension 50L has the same structure as the right suspension 50R. That is, the left suspension 50L also includes the cylinder 52, the piston rod 53, and the piston 54.

The piston 54 partitions the hydraulic fluid chamber R into a first hydraulic fluid chamber R1 and a second hydraulic fluid chamber R2. A hydraulic fluid channel (described later) connecting the dampers 51R and 51L is connected to the first hydraulic fluid chamber R1. The piston 54 has orifices 54a and 54b formed therein. The orifices 54a and 54b allow the hydraulic fluid to flow between the first hydraulic fluid chamber R1 and the second hydraulic fluid chamber R2. The cylinder 52 includes a cap 52c closing the hydraulic fluid chamber R at the end of the cylinder 52 (the lower end in the example shown in FIG. 7). The piston rod 53 extends from the piston 54 through the second hydraulic fluid chamber R2 toward the cap 52c and protrudes from the cap 52c to the outside of the cylinder 52.

As shown in FIG. 7, a spring seat 52d is fixed on the outer side of the cylinder 52. The piston rod 53 includes a spring seat 53b. The spring 59R is held between the spring seat 52d and the spring seat 53b. A spring 59L for the left suspension 50L, likewise, is held between the spring seat 52d and the spring seat 53b.

As described above, the cylinders 52 of the right and left dampers 51R and 51L are connected to each other via a hydraulic fluid channel so that the hydraulic fluid flows between the right damper 51R and the left damper 51L. Specifically, as shown in FIG. 6A, the first hydraulic fluid chambers R1 of the right and left dampers 51R and 51L are connected to each other via the hydraulic fluid channel. When the snowmobile 1 turns, the hydraulic fluid channel allows the hydraulic fluid to flow from the first damper fluid chamber R1 of the outer damper to the first hydraulic fluid chamber R1 of the inner damper. As a result, a force acts on and extends the inner damper. For example, when the snowmobile 1 turns to the right, the hydraulic fluid flows from the left damper 51L to the right damper 51R. As a result, a force acts on and extends the right damper 51R. This flow of hydraulic fluid reduces the difference in contact pressure on the snow's surface between the left ski 41L and the right ski 41R during turning, and can further improve the ride comfort during turning of snowmobile 1.

The springs 59R and 59L of the right suspensions 50R and 50L are independent of each other. In the example of snowmobile 1, the springs 59R and 59L are coil springs. Since the springs 59R and 59L are independent of each other, unlike the springs of the snowmobile of US Patent Application Publication No. 2012/0112424, a rider can return the posture of the vehicle body to the horizontal posture by utilizing the spring force exerted from the springs 59R and 59L after the vehicle body tilts to the right or the left. The suspensions 50R and 50L may include an air spring in place of the coil spring.

As shown in FIG. 6A, the snowmobile 1 includes an intermediate unit 60 including an intermediate cylinder 62. The intermediate cylinder 62 includes a hydraulic fluid chamber T1 and a gas chamber T2 therein. The hydraulic fluid chamber T1 and the gas chamber T2 are partitioned by a free piston 62a movable along the axis D2 (see FIG. 7) of the intermediate cylinder 62. The hydraulic fluid channel, which connects the right damper 51R and the left damper 51L, includes a first channel 1S and a second channel 2S. The first channel 1S connects the first hydraulic fluid chamber R1 of the right damper 51R and the hydraulic fluid chamber T1 of the intermediate cylinder 62. The second channel 2S connects the first hydraulic fluid chamber R1 of the left damper 51L and the hydraulic fluid chamber T1 of the intermediate cylinder 62.

The first channel 1S and the second channel 2S are separately connected to the intermediate cylinder 62. That is, the intermediate cylinder 62 includes a port to which the first channel 1S is connected and a port to which the second channel 2S is connected. In the example of snowmobile 1, the first channel 1S includes a right pipe 71R and a channel 64R (see FIG. 6A) formed inside a connection part 69 (see FIG. 7) of the intermediate unit 60. The second channel 2S, likewise, includes a left pipe 71L and a channel 64L (see FIG. 6A) formed inside the connection part 69 (see FIG. 7) of the intermediate unit 60.

FIGS. 6B and 6C illustrate exemplary functions of the intermediate cylinder 62 and the left and right dampers 51R and 51L. FIG. 6B illustrates a function in a situation where both dampers 51R and 51L are contracted. FIG. 6C illustrates a function in a situation where only the right damper 51R is contracted.

When the skis 41R and 41L move upward at the same time, both of the dampers 51R and 51L contract as shown in FIG. 6B, and the hydraulic fluid flows from both the hydraulic fluid chambers R1 of the dampers 51R and 51L to the hydraulic fluid chamber T1 of the intermediate cylinder 62. As a result, the free piston 62a compresses the gas chamber T2. Conversely, when the skis 41R and 41L move downward at the same time, both the dampers 51R and 51L extend. As a result, the hydraulic fluid flows from the hydraulic fluid chamber T1 of the intermediate cylinder 62 to the hydraulic fluid chambers R1 of the dampers 51R and 51L, and the gas chamber T2 expands. That is, when the skis 41R and 41L move upward together or move downward together, the movement of the skis 41R and 41L can be absorbed by the contraction/expansion of the springs 59R and 59L and by the compression/expansion of the gas in the gas chamber T2.

At the time of turning the vehicle, a large load acts on the outer damper. Specifically, a force to contract the outer damper acts thereon. Therefore, the hydraulic fluid flows from the outer damper to the inner damper. For example, when the vehicle turns to the left, the right damper 51R contracts as shown in FIG. 6C. Then, the hydraulic fluid flows from the right damper 51R to the left damper 51L, and the left damper 51L then extends. Accordingly, the difference in contact pressure on the snow's surface between the right ski 41R and the left ski 41L can be reduced. When the vehicle turns to the right, the left damper 51L contracts and the hydraulic fluid flows from the left damper 51L to the right damper 51R. As a result, the right damper 51R extends. Accordingly, the difference in contact pressure on the snow's surface between the right ski 41R and the left ski 41L can be reduced. When the bypass channel 61, to be described later, is closed, the hydraulic fluid flows between the right damper 51R and the left damper 51L via the hydraulic fluid chamber T1 of the intermediate cylinder 62. Conversely, when bypass channel 61 is open, the hydraulic fluid flows between the right damper 51R and the left damper 51L via the bypass channel 61.

As shown in FIG. 6A, the right pipe 71R and the left pipe 71L may be connected to each other through the bypass channel 61. The bypass channel 61 connects the first channel 1S (more specifically, the right pipe 71R) and the second channel 2S (more specifically, the left pipe 71L), while bypassing the hydraulic fluid chamber T1 of the intermediate cylinder 62. When the connection position between the bypass channel 61 and the first channel 1S is defined as a first position, the first position is located away from a throttle valve 63R (described later) toward the cylinder 52 of the right damper 51R. Similarly, when the connection position between the bypass channel 61 and the second channel 2S is defined as a second position, the second position is located away from the throttle valve 63L (described later) toward the cylinder 52 of the left damper 51L. That is, the bypass channel 61 connects the first channel 1S and the second channel 2S while bypassing the intermediate cylinder 62 and the throttle valves 63R and 63L. Accordingly, when the hydraulic fluid flows through the bypass channel 61 between the first channel 1S and the second channel 2S, the hydraulic fluid does not go through the intermediate cylinder 62 and the throttle valves 63R and 63L.

A valve 61a for opening and closing the bypass channel 61 is provided in the bypass channel 61. Hereinafter the valve 61a is referred to as an "opening/closing valve". The opening/closing valve 61a may allow the hydraulic fluid to flow through the bypass channel 61 and may restrict the flow of hydraulic fluid through the bypass channel 61. When the bypass channel 61 is in the open state, the hydraulic fluid flows between the right pipe 71R and the left pipe 71L without passing through the intermediate cylinder 62. As a result, the flow of hydraulic fluid between the right damper 51R and the left damper 51L can be accelerated.

In the example of snowmobile 1, the intermediate cylinder 62 and the bypass channel 61 are provided in the intermediate unit 60. As shown in FIG. 7, the intermediate unit 60 includes a connection part 69 fixed to the intermediate cylinder 62. The right and left pipes 71R and 71L respectively include nipples 71a at the ends thereof. The nipples 71a are connected to the connection part 69. The bypass channel 61 is formed inside the connection part 69. In the example of snowmobile 1, the connection part 69 is attached to the end (more specifically, the upper end) of the intermediate cylinder 62.

A valve operation part 61b for an operator to operate the opening/closing valve 61a is provided to the connection part 69. In the example shown in FIG. 7, the valve operation part 61b protrudes from the upper surface of the intermediate unit 60. The right side surface of the connection part 69 has the end of the right pipe 71R connected thereto. The left side surface of the connection part 69 has the end of the left pipe 71L connected thereto.

The structure of the intermediate unit 60 is not limited to the example shown in FIGS. 6A and 7. In another example, the valve operation part 61b may be provided on the front surface of the connection part 69. In still another example, the bypass channel 61 may be a pipe connecting the right pipe 71R and the left pipe 71L, not a channel formed inside the intermediate unit 60. Instill another example, snowmobile 1 may not include the bypass channel 61. The connection position between the connection part 69 and the pipes 71R and 71L is not limited to the example shown in FIG. 7, and may be modified.

As shown in FIG. 6A, in the example of snowmobile 1, throttle valves 63R and 63L are provided in the hydraulic fluid channel connecting the right damper 51R and the left damper 51L. Specifically, the throttle valves 63R and 63L are provided in the channel connecting the right damper 51R and the left damper 51L via the hydraulic fluid chamber T1 of the intermediate cylinder 62. The throttle valves 63R and 63L cause resistance against the flow of hydraulic fluid between the right damper 51R and the left damper 51L via the hydraulic fluid chamber T1 of the intermediate cylinder 62. For example, the throttle valve 63R causes resistance against the flow from the first pipe 71R to the hydraulic fluid chamber T1 of the intermediate cylinder 62. On other hand, the throttle valve 63L causes resistance against the flow from the second pipe 77L to the hydraulic fluid chamber T1 of the intermediate cylinder 62.

Alternatively, the throttle valve 63R may be configured to cause resistance against the flow from the first pipe 71R to the hydraulic fluid chamber T1 of the intermediate cylinder 62 and to cause resistance against the flow from the hydraulic fluid chamber T1 of the intermediate cylinder 62 to the first pipe 71R. Further, the throttle valve 63L may be configured to cause resistance against the flow from the second pipe 77L to the hydraulic fluid chamber T1 of the intermediate cylinder 62 and to cause resistance against the flow from the hydraulic fluid chamber T1 of the intermediate cylinder 62 to the second pipe 71L.

The throttle valves 63R and 63L allow that, when the snowmobile 1 rolls, that is, when the vehicle body sways around the axis along the front-back direction, and when the right and left skis 41R and 41L move up and down together, the damping function due to the resistance caused by the orifices 54a and 54b of the pistons 54 of the dampers 51R and 51L and the damping function due to the resistance caused by the throttle valves 63R and 63L can be utilized.

In the example of snowmobile 1, the throttle valves 63R and 63L are provided in the intermediate unit 60. More specifically, the throttle valves 63R and 63L are provided in the connection part 69 (see FIG. 7) of the intermediate unit 60. The throttle valve 63R is located between the end of the first pipe 71R and the hydraulic fluid chamber T1. The throttle valve 63L is located between the end of the second pipe 77L and the hydraulic fluid chamber T1.

In the example of snowmobile 1, the throttle valves 63R and 63L employ a variable throttle valve whose degree of throttle (in other words, flow rate) is adjustable. Such a valve includes, for example, a needle valve that adjusts the degree of openness of the flow channel. The intermediate unit 60 includes, in the connection part 69, valve operation parts 63m and 63n (for example, rotatable knobs) for a user to operate the throttle valves 63R and 63L. The user can adjust the degree of throttle of the throttle valves 63R and 63L by the valve operation parts 63m and 63n. In the example of snowmobile 1, the valve operation parts 63m and 63n are provided on a surface (front surface) intersecting the surface (upper surface) on which the valve operation part 61b of the opening/closing valve 61a is provided.

The structure of the intermediate unit 60 is not limited to the example shown in FIGS. 6A and 7. For example, the throttle valves 63R and 63L may not be variable throttle valves. That is, the throttle valves 63R and 63L may be valves whose degree of throttle is fixed. In this case, the intermediate unit 60 may not include the valve operation parts 63m and 63n.

In another example, the intermediate unit 60 may not include the throttle valves 63R and 63L. In this case, the throttle valves 63R and 63L may be provided in a midway position in the pipes 71R and 71L, respectively.

Figure 8:
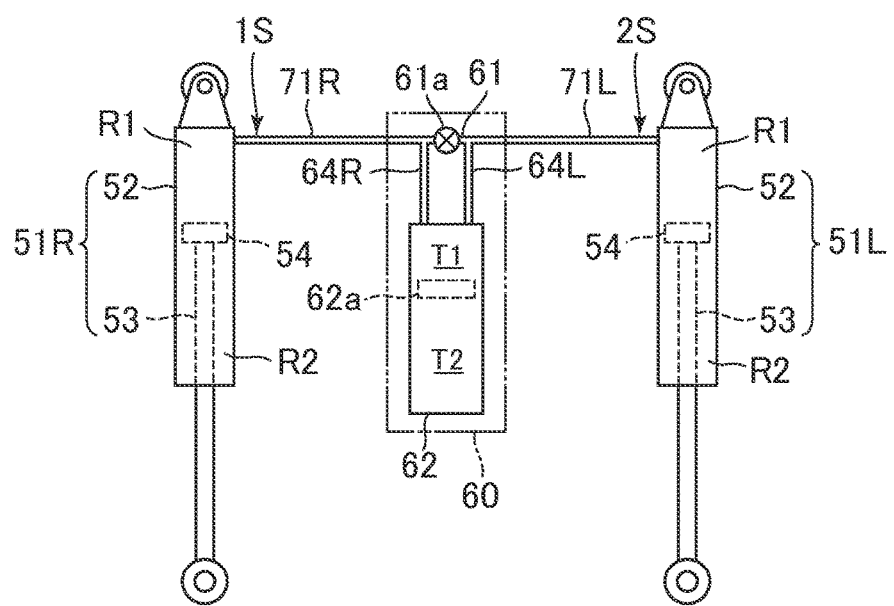
FIG. 8 shows a modified example of the intermediate unit.

In still another example, as shown in FIG. 8, the snowmobile 1 may not include the throttle valves 63R and 63L. That is, no throttle valve may be provided in the channel connecting the right and left pipes 71R and 71L via the hydraulic fluid chamber T1 of the intermediate cylinder 62. In this case, the flow of hydraulic fluid can be accelerated between the right damper 51R and the left damper 51L.

The suspensions 50R and 50L are arranged such that the cylinder 52 thereof is positioned in the upper portion of the suspensions 50R and 50L and the piston rod 53 is positioned in the lower portion of the suspensions 50R and 50L (see FIG. 7). The upper end 52a of the cylinder 52 is connected to the vehicle frame 30 (more specifically, the ski support frame 31). The lower end 53a of the piston rod 53 is connected to the lower arm 42R, 42L.

As described above, the right ski 41R is supported by the lower arm 42R and the upper arm 43R, and the left ski 41L is supported by the lower arm 42L and the upper arm 43L. As shown in FIG. 4, the right pipe 71R is connected to the cylinder 52 of the damper 51R at a position higher than the upper arm 43R. The left pipe 71L is connected to the cylinder 52 of the damper 51L at a position higher than the upper arm 43L. This arrangement of the dampers 51R and 51L and the upper arms 43R and 43L facilitates work for installing the pipes 71R and 71L into the vehicle in a manufacturing process of the snowmobile 1, compared with the arrangement in which the pipes 71R and 71L are connected to the cylinder 52 at a position lower than the upper arms 43R and 43L.

In the example of snowmobile 1, the intermediate unit 60 is located higher than the suspensions 50R and 50L (see FIG. 1). The pipes 71R and 71L are connected to the uppermost portion of the cylinder 52. As a result, the lengths of the pipes 71R and 71L can be shortened. In the example shown in FIG. 7, the cylinder 52 includes a cylindrical member 52e formed in a cylindrical shape and a cap 52f attached to and closing the upper end of the cylindrical member 52e. A channel is formed in the cap 52f to connect to the pipes 71R and 71L. As shown in FIG. 2, the pipes 71R and 71L protrude outward from the cylinder 52 in the vehicle width direction. That is, the right pipe 71R protrudes rightward from the uppermost portion of the cylinder 52, and then extends toward the intermediate unit 60. On other hand, the left pipe 71L protrudes leftward from the uppermost portion of the cylinder 52, and then extends toward the intermediate unit 60. This arrangement allows the pipes 71R and 71L to avoid interference with other members (for example, vehicle frame 30).

As shown in FIG. 1, the intermediate unit 60 is located further forward than the front end of the seat 8 in side view of the vehicle body. In the example of snowmobile 1, the intermediate unit 60 is positioned further forward than the steering column 22 in aside view of the vehicle body. This arrangement reduces the distance between the intermediate unit 60 and the dampers 51R and 51L and thus can prevent the pipes 71R and 71L from becoming excessively long.

The arms 42R, 43R, 42L, and 43L and the suspensions 50R and 50L supporting the skis 41R and 41L are located further forward than the engine 11 (see FIG. 1). The intermediate unit 60 is also located further forward than the engine 11, like the suspensions 50R and 50L. This arrangement more effectively prevents the pipes 71R and 71L from becoming excessively long. In the example of snowmobile 1, the intermediate unit 60 is positioned further forward than the suspensions 50R and 50L. A portion of the intermediate unit 60 may be located further rearward than the suspensions 50R and 50L. Alternatively, the entire intermediate unit 60 may be located further forward than the suspensions 50R and 50L.

The intermediate unit 60 is located outside an exterior member constituting the exterior of the vehicle body. More specifically, as shown in FIGS. 1 and 2, the snowmobile 1 includes, in the front portion thereof, a front cover 81 that constitutes the exterior of the vehicle body and covers the upper side of the ski support frame 31 and the engine 11. The intermediate unit 60 is located above the front cover 81. This arrangement facilitates work by a user for accessing the valve operation parts 61b, 63m, and 63n of the intermediate unit 60. In addition, this arrangement facilitates work of installing the pipes 71R and 71L and the intermediate unit 60 into the vehicle body in a manufacturing process of the snowmobile 1. The location of the intermediate unit 60 is not limited to the example of snowmobile 1. For example, the intermediate unit 60 may be attached to the vehicle frame 30.

As shown in FIG. 5, the intermediate unit 60 is held in a holder 39. The holder 39 is attached to the front cover 81 by fasteners such as bolts and screws. In the example of snowmobile 1, the intermediate unit 60 is cylindrical. The holder 39 surrounds the outer periphery of the intermediate unit 60. The holding structure of the intermediate unit 60 is not limited to the example of snowmobile 1. For example, the holder 39 may not be used for attaching the intermediate unit 60 on the vehicle body. In this case, the intermediate unit 60 itself may have holes formed therein into which the fasteners are inserted.

The intermediate unit 60 is located between the right suspension 50R and the left suspension 50L in a front view of the vehicle body. In the example of snowmobile 1, as shown in FIG. 2, the intermediate unit 60 is arranged so as to intersect with a vertical line passing through the center C1 in the lateral direction of the vehicle body. This arrangement reduces the difference between the lengths of the right pipe 71R and the left pipe 71L. In the example of snowmobile 1, the intermediate unit 60 is arranged such that the axis of the intermediate cylinder 62 (a straight line along the movement direction of the free piston 62a, see D2 in FIG. 7) coincides with the center C1 in front view of the vehicle body. That is, the intermediate unit 60 is located at the center in the left-right direction of the vehicle body. As a result, the length of the right pipe 71R is substantially equal to the length of the left pipe 71L.

The hydraulic fluid channel connecting the right and left dampers 51R and 51L has an adjusting device for adjusting the flow of hydraulic fluid. As examples of the adjusting device, the snowmobile 1 includes the opening/closing valve 61a and the throttle valves 63R and 63L described above. The opening/closing valve 61a has the valve operation part 61b for switching the opening and closing of the valve 61a. The throttle valves 63R and 63L respectively have the valve operation parts 63m and 63n for adjusting a degree of throttle of the throttle valves 63R and 63L. In the example of snowmobile 1, the opening/closing valve 61a, the throttle valves 63R and 63L, and the valve operation parts 61b, 63m, and 63n are provided in the intermediate unit 60. The intermediate unit 60 is arranged outside the exterior member of the snowmobile 1. More specifically, the intermediate unit 60 is disposed above the front cover 81. Therefore, the valve operation parts 61b, 63m, and 63n are also exposed to the outside of the vehicle body. In other words, the valve operation parts 61b, 63m, and 63n are positioned outside the exterior member. This arrangement of the valve operation parts 61b, 63m, and 63n facilitates users accessing the valve operation parts 61b, 63m, and 63n. The structure and the arrangement of the intermediate unit 60 is not limited to the example of snowmobile 1. For example, the intermediate unit 60 may be disposed inside the exterior member, and the valve operation parts 61b, 63m, and 63n may be covered with a cover that can be opened. Further, the adjusting devices may not be the opening/closing valve 61a or the throttle valve 63R, 63L, as long as the adjusting devices are capable of changing the flow speed or switching channels of hydraulic fluid.

Figure 9:
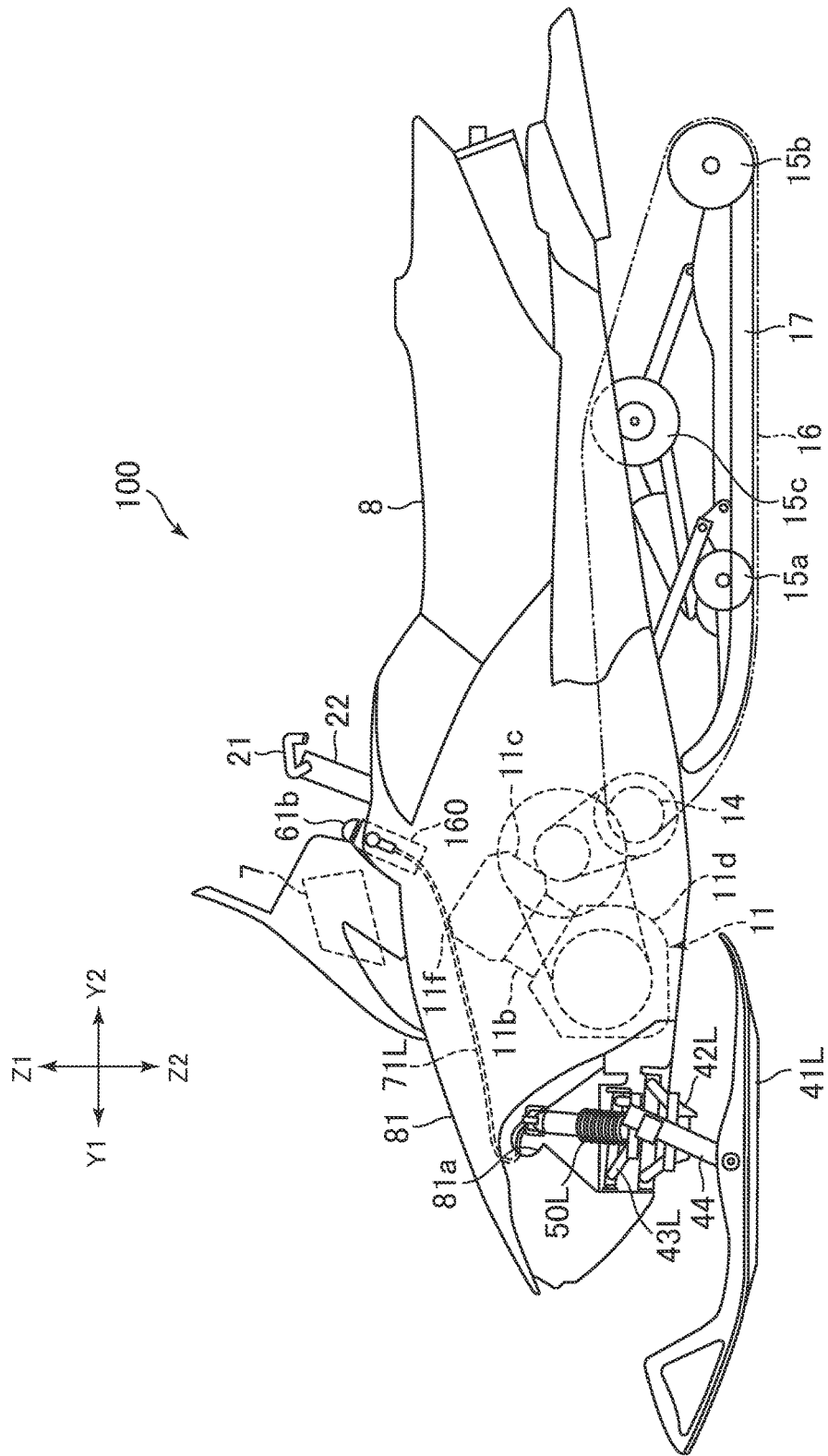
FIG. 9 is a side view showing another exemplary snowmobile of the embodiments according to the present invention.
Figure 10:
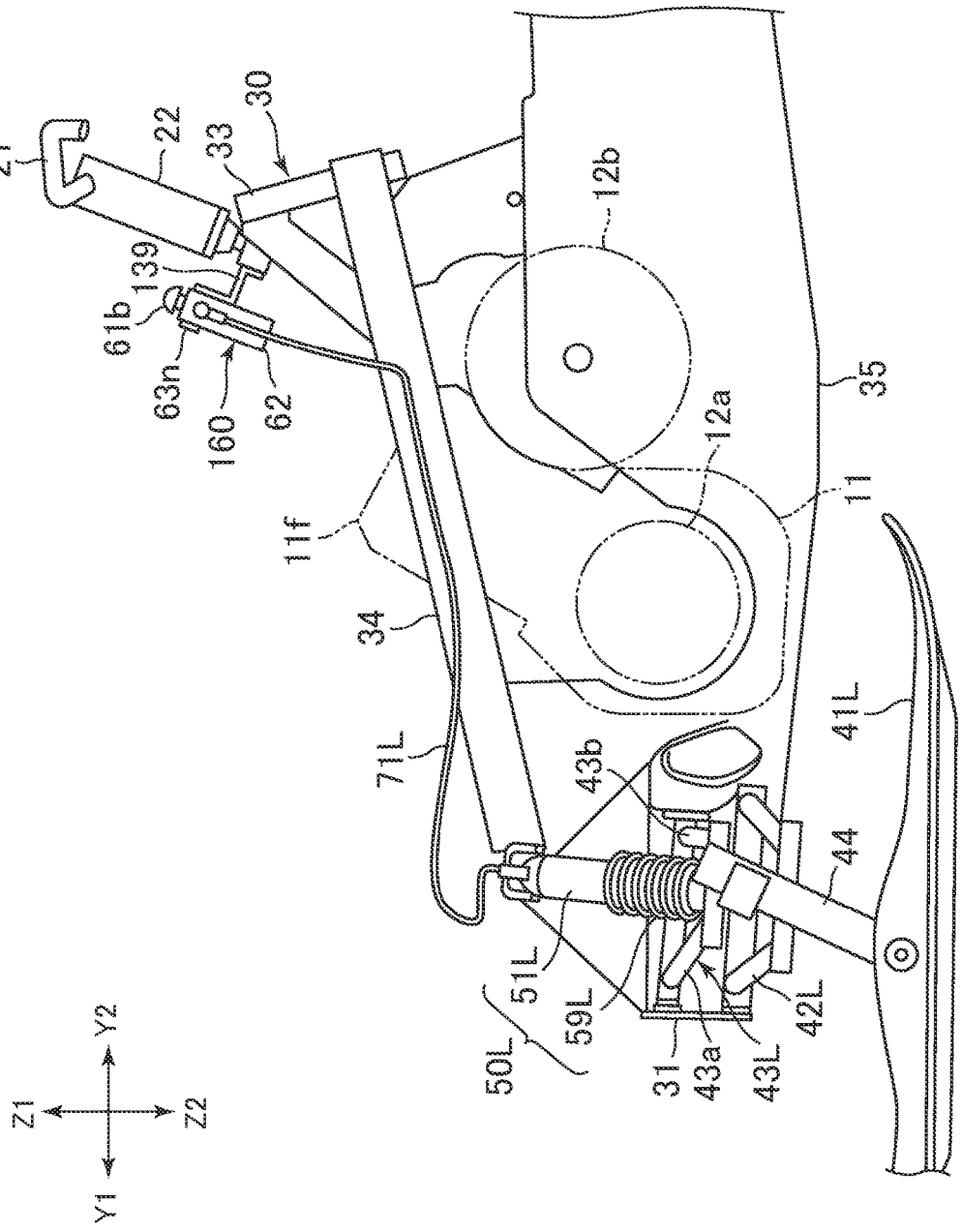
FIG. 10 is a side view of the vehicle frame, the support structure of the skis, and the intermediate unit that are provided to the snowmobile shown in FIG. 9.
Figure 11:
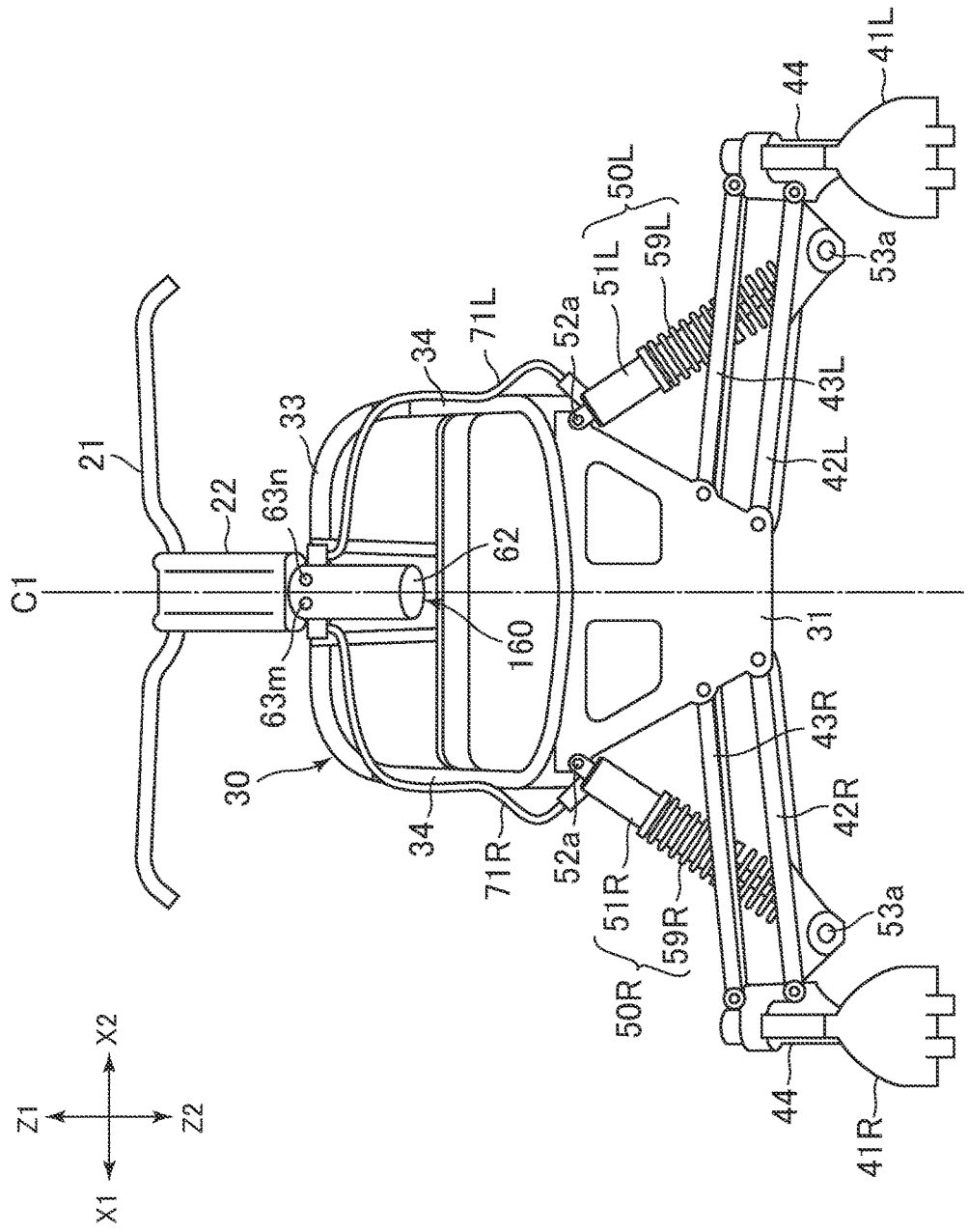
FIG. 11 is a front view of the vehicle frame, the support structure of the skis, and the intermediate unit that are provided to the snowmobile shown in FIG. 9.

FIGS. 9, 10, and 11 show modifications of the snowmobile 1. These figures show a snowmobile 100 as a modified example. FIG. 9 is a side view of the snowmobile 100. The snowmobile 100 includes an intermediate unit 160. Like the intermediate unit 60 described above, the intermediate unit 160 includes the intermediate cylinder 62, the opening/ closing valve 61a, the throttle valves 63R and 63L, and the like. FIG. 10 is a side view of the vehicle frame 30, the support structure of the ski 41L, and the intermediate unit 160 included in the snowmobile 100. FIG. 11 is a front view of the vehicle frame 30, the support structures of the skis 41R and 41L, and the intermediate unit 160. In these figures, the same portions as those described above are given the same reference numerals as those in FIGS. 1 to 7. In the following description, the same features as those described in FIGS. 1 to 7 are not described.

The intermediate unit 160 is positioned further forward than the steering column 22. As shown in FIG. 9, in the example of the snowmobile 100, the intermediate unit 160 is located between the indicator 7 and the steering column 22 in a side view of the vehicle body. This arrangement reduces the distance between the driver sitting on the seat 8 and the intermediate unit 160. As a result, the operation of the valve operation parts 61b, 63m, and 63n of the intermediate unit 160 can be easy for the driver.

The intermediate unit 160 is arranged such that the axis of the intermediate cylinder 62 is inclined relative to the horizontal plane in the side view of the vehicle body. This posture of the intermediate unit 160 reduces the space required for the arrangement of the intermediate unit 160 in the front-rear direction. In the example of snowmobile 100, as shown in FIG. 10, the intermediate unit 160 is inclined like the steering column 22. That is, the axis of the intermediate cylinder 62 and the steering column 22 extend upward and are inclined backward. This arrangement of the intermediate unit 160 can effectively utilize the relatively small space in front of the steering column 22 for the intermediate unit 160. In the example of the snowmobile 100, the intermediate unit 160 is arranged such that the axis of the intermediate cylinder 62 extends along the extending direction of the steering column 22. Unlike the example of the snowmobile 100, the intermediate unit 160 may be inclined relative to the extending direction of the steering column 22.

As shown in FIG. 11, the intermediate unit 160 is located in front of the steering column 22. The intermediate unit 160 overlaps the steering column 22 in a front view of the vehicle body. This arrangement of the intermediate unit 160 can reduce the difference between the length of the pipe 71R and the length of the pipe 71L. In the example of snowmobile 100, the intermediate unit 160 is located directly in front of the steering column 22. That is, the intermediate unit 160 is located at the center in the left-right direction of the vehicle body. Thus, the length of the pipe 71R and the length of the pipe 71L can be substantially equal. The arrangement of the intermediate unit 160 is not limited to the example shown in FIG. 11. For example, the intermediate unit 160 may be located rightward or leftward from the steering column 22.

The vehicle frame 30 includes a column support portion 33 supporting the steering column 22. As shown in FIGS. 10 and 11, the intermediate unit 160 is supported by the column support portion 33. This structure reduces the distance between the steering handle 21 and the intermediate unit 160. As a result, it is easy for the driver to operate the valve operation parts 61b, 63m, and 63n of the intermediate unit 160.

As shown in FIG. 10, the intermediate unit 160 is located higher than the upper end 11f of the engine 11. This arrangement of the intermediate unit 160 can reduce the distance between the steering handle 21 and the intermediate unit 160. As a result, it is easy for the driver to operate the valve operation parts 61b, 63m, and 63n of the intermediate unit 160.

Figure 12:
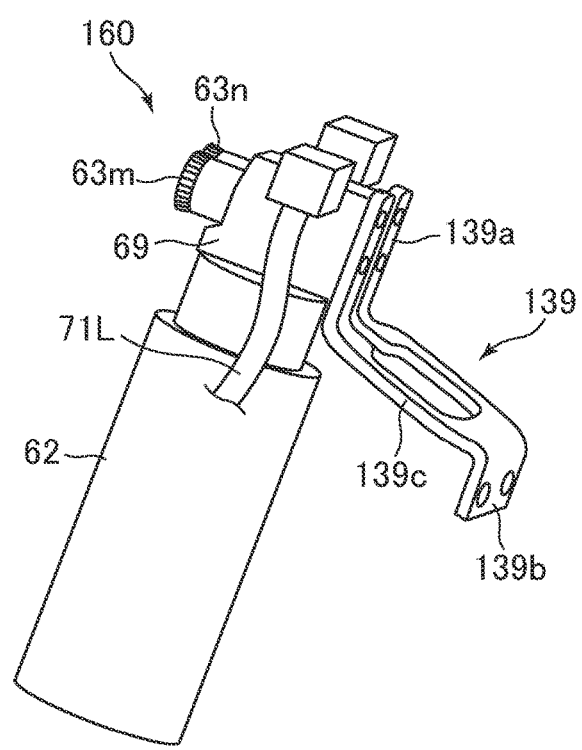
FIG. 12 is a perspective view for illustrating the support structure of the intermediate unit that is provided to the snowmobile shown in FIG. 9.

FIG. 12 is a perspective view for explaining the support structure for the intermediate unit 160. This figure shows the intermediate unit 160 to which an attachment bracket 139 is attached. The attachment bracket 139 is attached to the rear side of the intermediate unit 60. The attachment bracket 139 includes a fixed portion 139a, attached to the intermediate unit 60 by fasteners such as screws or bolts, and a fixed portion 139b attached to the column support portion 33 by fasteners such as screws or bolts. Further, the attachment bracket 139 includes a ring portion 139c between the fixed portions 139a and 139b. In an example, a cable (not shown) and a hose (not shown) extending from the steering handle 21 are inserted inside the ring portion 139c. This allows the cable and the hose to be clamped to the column support portion 33.

As shown in FIG. 9, in the example of the snowmobile 100, the pipes 71R and 71L are located inside the exterior member, that is, the front cover 81 constituting the exterior of the vehicle body. In an example, the pipes 71R and 71L pass under the left and right edges of the front cover 81 toward the inside of the vehicle body cover 80. This arrangement of the pipes 71R and 71L facilitates manufacturing of the snowmobile 100. If a snowmobile has a structure in which the pipes 71R and 71L are passed through holes formed in the front cover 81, the manufacturing of the snowmobile requires processes that the pipes 71R and 71L are passed through the holes of the front cover 81 and then the pipes 71R and 71L are connected to the intermediate cylinder 62 or the dampers 51R and 51L. Since the pipes 71R and 71L in the snowmobile 100 pass under the edges of the front cover 81, the manufacturing does not require the process that the pipes 71R and 71L are passed through the holes of the front cover 81, which simplifies manufacturing of the snowmobile. As shown in FIG. 9, cutouts 81a may be formed on the left and right edges of the front cover 81, and the pipes 71R and 71L may pass through the cutouts 81a.

As shown in FIG. 9, the pipes 71R and 71L extend rearward from the dampers 51R and 51L inside the front cover 81. The pipes 71R and 71L are then connected to the intermediate cylinder 62 of the intermediate unit 160. The pipes 71R and 71L may be clamped to the side frames 34 extending rearward from the ski support frame 31 toward the column support portion 33.

The hydraulic fluid channel connecting the right damper 51R and the left damper 51L has the adjusting device for adjusting the flow of hydraulic fluid. Like the snowmobile 1, the snowmobile 100 includes the opening/closing valve 61a and the valve operation part 61b as an example of the adjusting device. The opening/closing valve 61a and the valve operation part 61b is exposed outside the vehicle body. This allows the driver to easily access the valve operation part 61b.

In the example of snowmobile 100, the intermediate unit 160 is supported in a posture in which the connection part 69 is positioned above the intermediate cylinder 62. As shown in FIG. 9, the valve operation part 61b for the opening/closing valve 61a is exposed upward between the steering column 22 and the indicator 7. The snowmobile 100 has no cover and no part covering the upper side of the valve operation part 61b. The arrangement of the intermediate unit 60 is not limited to the example described here. For example, the valve operation parts 63m and 63n for the throttle valves 63R and 63L may be exposed upward between the steering column 22 and the indicator 7. In another example, the upper sides of the valve operation parts 61b, 63m, and 63n may be covered by a cover than can be opened.

As described above, the valve operation part 61b in the snowmobile 100 is located within the vicinity of the steering handle 21. Therefore, the driver can easily access the valve operation part 61b. "The valve operation part 61b is located within the vicinity of the steering handle 21" means that the valve operation part 61b is positioned within a range reachable for the driver sitting on the seat 8. Unlike the snowmobile 100, the valve operation part 61b may be attached to the steering handle 21 itself. In this case, the snowmobile may include an actuator for operating the opening/closing valve 61a, according to the operation by the driver of the valve operation part 61b. Also, the valve operation part 61b may be positioned in front of or behind the steering column 22 without the presence of other parts and other members between the valve operation part 61b and the steering column 22. In this case, the snowmobile 100 may include an actuator for operating the opening/closing valve 61a according to the operation by the driver of the valve operation part 61b.

The snowmobile discussed above is not limited to the embodiments described above, and various modifications may be made. For example, the snowmobile may be modified as described below.

Figure 13:
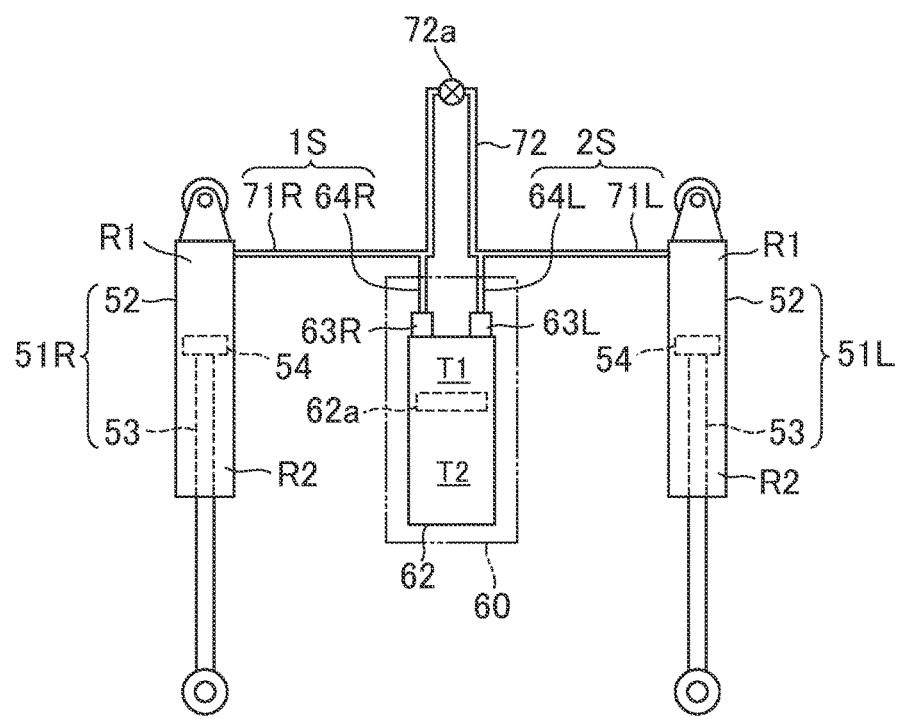
FIG. 13 shows a modified example of the intermediate unit.

FIG. 13 shows a modified example of the hydraulic fluid channel connecting the right damper 51R and the left damper 51L. In the example shown in this figure, the bypass channel is a pipe 72 connecting the right pipe 71R and the left pipe 71L in place of the bypass channel 61 formed inside the intermediate unit 60. The pipe 72 is, for example, a flexible hose. An opening/closing valve 72a and a valve operation part for a user to operate the opening/closing valve 72a are provided in a midway portion of the pipe 72. In this case, the pipe 72 may be clamped within the vicinity of the steering column 22. Further, the pipe 72 may be located in front of or behind the steering column 22 and arranged along the steering column 22. In an example, the intermediate unit 60 is attached to the column support portion 33 of the vehicle frame 30 via the attachment bracket 139 as in the example shown in FIG. 9. In this example, the valve operation part of the opening/closing valve 72a may be attached to the steering handle 21. The pipe 72 may be held by the ring portion 139c of the attachment bracket 139.

Figure 14:
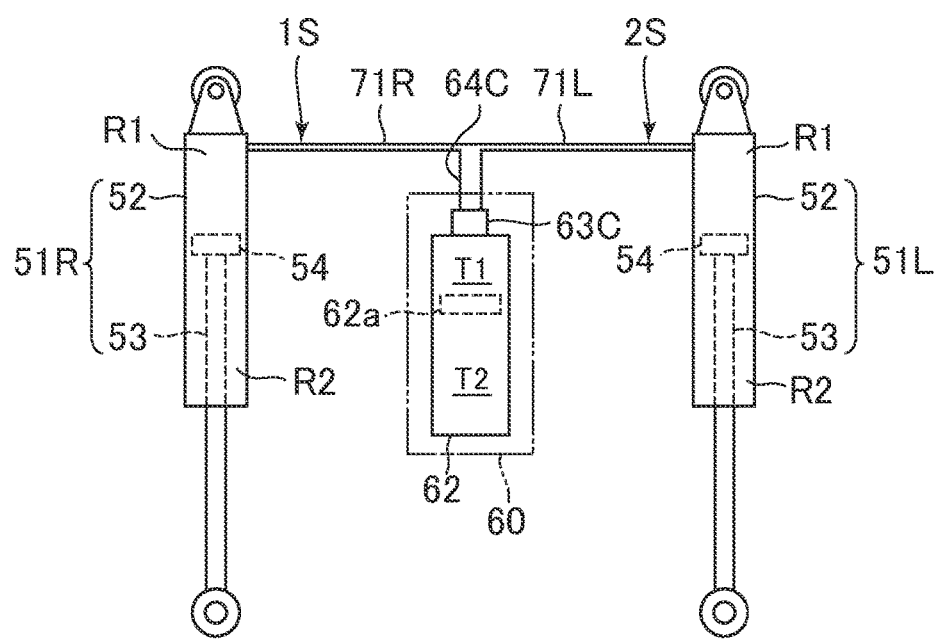
FIG. 14 shows still another modified example of the intermediate unit.

In still another example, as shown in FIG. 14, a common channel 64C may be provided for the first channel 1S and the second channel 2S. As described above, the first channel 1S connects the hydraulic fluid chamber R1 of the right damper 51R and the hydraulic fluid chamber T1 of the intermediate cylinder 62. The second channel 2S connects the hydraulic fluid chamber R1 of the left damper 51L and the hydraulic fluid chamber T1 of the intermediate cylinder 62. As shown in FIG. 14, the first channel 1S and the second channel 2S may be connected to the intermediate cylinder 62 through the common channel 64C. That is, the first channel 1S and the second channel 2S may be connected to a common port provided in the intermediate cylinder 62. In an example, as shown in FIG. 14, the first channel 1S, the second channel 2S, and the channel 64C are formed of a T-shaped pipe. A portion in this pipe corresponding to the common channel 64C, is connected to the intermediate unit 60.

In still another example, the common channel 64C may be formed inside the connection part 69 of the intermediate unit 60. In this example, the first channel 1S may be constituted by the right pipe 71R connected to the connection part 69 of the intermediate unit 60. Further, the second channel 2S may be constituted by the left pipe 71L connected to the connection part 69 of the intermediate unit 60.

In the structure shown in FIG. 14, for example, when both the dampers 51R and 51L contract, the hydraulic fluid flows from the hydraulic fluid chambers R1 of the dampers 51R and 51L to the hydraulic fluid chamber T1 of the intermediate cylinder 62, similarly to the structure shown in FIG. 6A. As a result, the free piston 62a compresses the gas chamber T2. On the other hand, when the vehicle turns, the hydraulic fluid flows from the outer damper to the inner damper without passing through the hydraulic fluid chamber T1 of the intermediate cylinder 62. For example, when the vehicle turns to the left, the right damper 51R contracts and the hydraulic fluid flows from the right damper 51R to the left damper 51L without passing through the hydraulic fluid chamber T1 of the intermediate cylinder 62. Therefore, the left damper 51L extends. As a result, the difference in contact pressure on the snow's surface between the right ski 41R and the left ski 41L can be reduced. The arrangement and location of the intermediate unit 60 shown in FIG. 14 may be similar to those described with reference to FIGS. 1 to 5, or those described with reference to FIGS. 9 to 11.

As shown in FIG. 14, a throttle valve 63C may be provided to the common channel 64C. The throttle valve 63C causes resistance against the flow of hydraulic fluid between the damper 51R, 51L and the intermediate cylinder 62. The first channel 1S extending from the right damper 51R and the second channel 2S extending from the left damper 51L are connected to each other at a position located away from the throttle valve 63C towards the dampers 51R and 51L. Therefore, for example, when only the right damper 51R contracts, the hydraulic fluid flows from the right damper 51R to the left damper 51L without passing through the throttle valve 63C and the intermediate cylinder 62. The throttle valve 63C is, for example, a variable throttle valve whose degree of throttle can be adjusted. In this case, the intermediate unit 60 includes a valve operation part for a user to operate the throttle valve 63C. Unlike the example in FIG. 14, the throttle valve 63C may be provided in a portion different from the intermediate unit 60.

Figure 15:
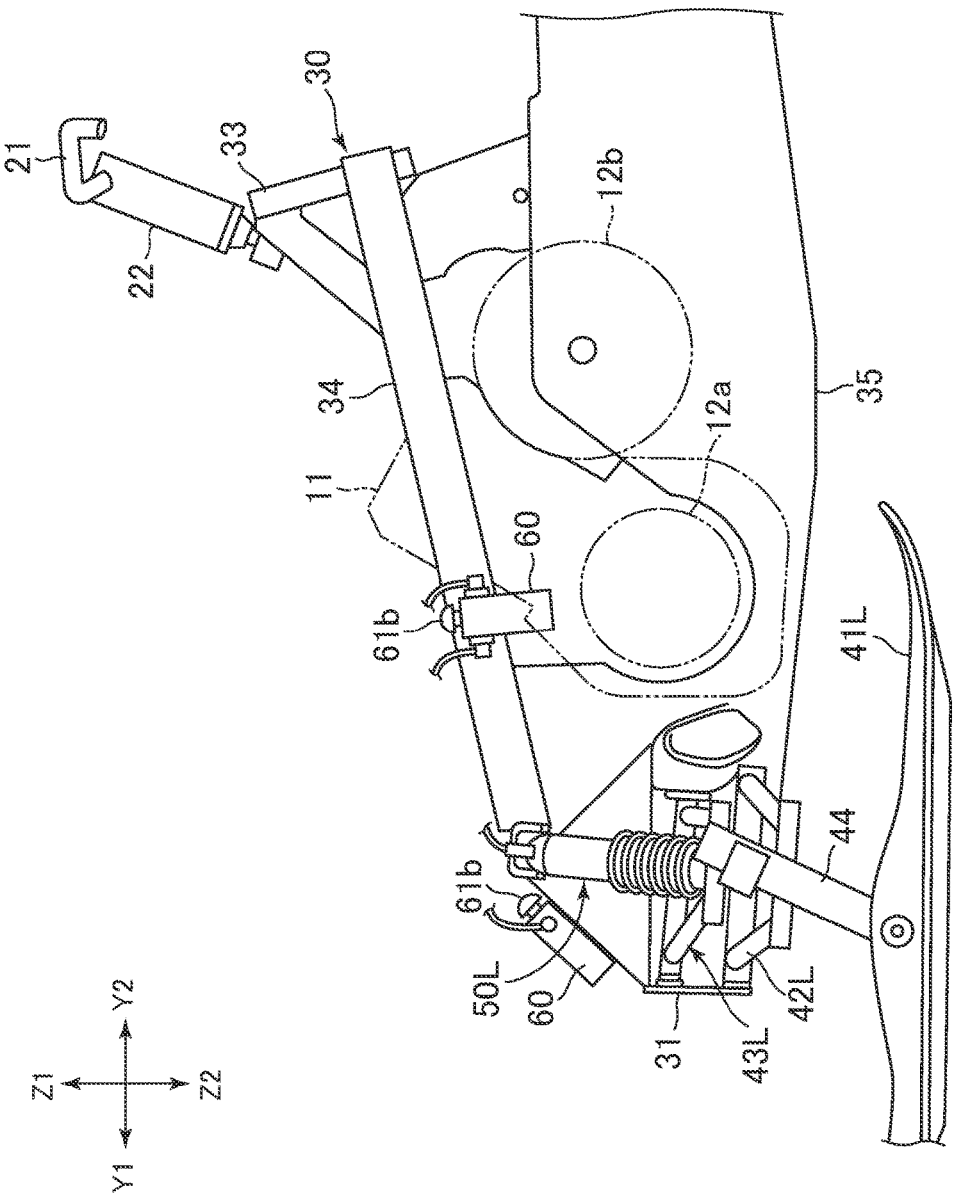
FIG. 15 shows a modified example of the layout of the intermediate unit.

FIG. 15 is a side view showing still another layout of the intermediate unit 60. As shown in this figure, the intermediate unit 60 may be attached to the ski support frame 31. Alternatively, the intermediate unit 60 may be attached to the side frame 34 connecting the ski support frame 31 and the column support portion 33.

In still another example, the intermediate unit 60 may be attached to one of the right damper 51R and the left damper 51L. Further, the snowmobile may include a pipe connecting the other damper and the intermediate unit 60.

Although the present invention has been illustrated and described herein with reference to embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:
1. A snowmobile comprising:
  a right ski;
  a left ski;
  a first right arm supporting the right ski and vertically movable relative to a vehicle body;
  a first left am supporting the left ski and vertically movable relative to the vehicle body;

a right suspension including a right damper and a right spring, the right damper being expandable and contractible according to the vertical movement of the first right arm, the right spring being configured to exert a spring force in an expansion/contraction direction of the right damper, the right damper including a cylinder that is configured to be filled with hydraulic fluid and a piston that moves inside the cylinder;

a left suspension including a left damper and a left spring, the left damper being expandable and contractible according to the vertical movement of the first left arm, the left spring being configured to exert a spring force in an expansion/contraction direction of the left damper, the left damper including a cylinder that is configured to be filled with the hydraulic fluid and a piston that moves inside the cylinder;

an intermediate cylinder; and a hydraulic fluid channel the hydraulic fluid channel comprising (i) a first channel connecting the cylinder of the right damper and the intermediate cylinder and (ii) a second channel connecting the cylinder of the left damper and the intermediate cylinder, so that the hydraulic fluid channel is configured to allow the hydraulic fluid to flow between the cylinders of the right and left dampers via the intermediate cylinder.

2. A snowmobile comprising:

a right ski;

a left ski;

a first right arm supporting the right ski and vertically movable relative to a vehicle body;

a first left arm supporting the left ski and vertically movable relative to the vehicle body;

a right suspension including a right damper and a right spring, the right damper being expandable and contractible according to the vertical movement of the first right arm, the right spring being configured to exert a spring force in an expansion/contraction direction of the right damper, the right damper including a cylinder that is configured to be filled with hydraulic fluid and a piston that moves inside the cylinder;

a left suspension including a left damper and a left spring, the left damper being expandable and contractible according to the vertical movement of the first left arm, the left spring being configured to exert a spring force in an expansion/contraction direction of the left damper, the left damper including a cylinder that is configured to be filled with the hydraulic fluid and a piston that moves inside the cylinder;

a hydraulic fluid channel connected to the cylinders of the right damper and the left damper so that the hydraulic fluid channel is configured to allow the hydraulic fluid to flow between the cylinders of the right and left dampers; and an intermediate unit comprising a cylinder, the cylinder including a hydraulic fluid chamber, a gas chamber, and a piston partitioning the inside of the cylinder into the hydraulic fluid chamber and the gas chamber, wherein the hydraulic fluid channel comprises (i) a first channel connecting the cylinder of the right damper and the cylinder of the intermediate unit and (ii) a second channel connecting the cylinder of the left damper and the cylinder of the intermediate unit.

3. The snowmobile according to claim 2, wherein
the first and second channels are separately connected to the cylinder of the intermediate unit.

4. The snowmobile according to claim 2, wherein
the first and second channels are connected to the cylinder of the intermediate unit through a common channel.

5. The snowmobile according to claim 2, wherein
a throttle valve is provided in a channel, where the channel comprises the first and second channels, and connects the cylinder of the right damper and the cylinder of the left damper via the hydraulic fluid chamber of the intermediate unit.

6. The snowmobile according to claim 2, wherein
no throttle valve is provided in a channel, where the channel comprises the first and second channels, and connects the cylinder of the right damper and the cylinder of the left damper via the hydraulic fluid chamber of the intermediate unit.

7. The snowmobile according to claim 2, wherein
the hydraulic fluid channel further comprises a bypass channel connecting the first channel and the second channel and bypassing the hydraulic fluid chamber of the intermediate unit.

8. The snowmobile according to claim 7, wherein
the hydraulic fluid channel comprises a valve for opening and closing the bypass channel.

9. The snowmobile according to claim 7, wherein
a throttle valve is provided in a channel, where the channel comprises the first and second channels and connects the cylinder of the right damper and the cylinder of the left damper via the hydraulic fluid chamber of the intermediate unit, the first channel has a first position that is located away from the throttle valve toward the cylinder of the right damper, the second channel has a second position that is located away from the throttle valve toward the cylinder of the left damper, and the bypass channel connects the first position and the second position.

10. The snowmobile according to claim 2, further comprising:
a seat for a driver to sit wherein
the intermediate unit is positioned further forward than the front end of the seat in a side view of the vehicle body.

11. The snowmobile according to claim 2, further comprising:
a steering handle and
a steering column connected to the steering handle for steering the right ski and the left ski, wherein
at least a portion of the intermediate unit is positioned further forward than the steering column in a side view of the vehicle body.

12. The snowmobile according to claim 2, wherein
the intermediate unit is arranged such that the cylinder of the intermediate unit has an axis inclined relative to a horizontal plane.

13. The snowmobile according to claim 2, further comprising:
an engine, wherein
at least a portion of the intermediate unit is positioned further forward than the engine in a side view of the vehicle body.

14. The snowmobile according to claim 2, further comprising:
an engine, wherein
at least a portion of the intermediate unit is positioned higher than an upper end of the engine in a side view of the vehicle body.

15. The snowmobile according to claim 2, wherein the intermediate unit intersects a vertical line passing through a center in the lateral direction of the vehicle body in front view of the vehicle body.

16. The snowmobile according to claim 2, wherein the first channel and the second channel have substantially the same length.

17. The snowmobile according to claim 2, wherein at least one of the hydraulic fluid channel and the intermediate unit includes an adjusting device that adjusts the hydraulic fluid flow.

18. The snowmobile according to claim 17, wherein the adjusting device includes an operation part for an operator to operate, and
the operation part is exposed outside the vehicle body.

19. The snowmobile according to claim 17, wherein the adjusting device includes an operation part for an operator to operate, and
the operation part is disposed in a vicinity of a steering handle.

20. The snowmobile according to claim 17, wherein the adjusting device comprises an operation part for an operator to operate, and
the operation part is located between a steering column and an indicator.

21. The snowmobile according to claim 17, wherein the hydraulic fluid channel includes a pipe having the adjusting device on a midway portion of the pipe, and
the pipe is clamped in a vicinity of a steering column.

22. A snowmobile comprising:
a right ski;
a left ski;
a first right arm supporting the right ski and vertically movable relative to a vehicle body;
a first left arm supporting the left ski and vertically movable relative to the vehicle body;
a right suspension including a right damper and a right spring, the right damper being expandable and contractible according to the vertical movement of the first right arm, the right spring being configured to exert a spring force in an expansion/contraction direction of the right damper, the right damper including a cylinder that is configured to be filled with hydraulic fluid and a piston that moves inside the cylinder;
a left suspension including a left damper and a left spring, the left damper being expandable and contractible according to the vertical movement of the first left arm, the left spring being configured to exert a spring force in an expansion/contraction direction of the left damper, the left damper including a cylinder that is configured to be filled with the hydraulic fluid and a piston that moves inside the cylinder; and
a hydraulic fluid channel connected to the cylinders of the right damper and the left damper so that the hydraulic fluid channel is configured to allow the hydraulic fluid to flow between the cylinders of the right and left dampers.

23. The snowmobile according to claim 22, further comprising:
a second right arm disposed above the first right arm and supporting the right ski, and
a second left arm disposed above the first left arm and supporting the left ski, wherein
the hydraulic fluid channel is connected to the cylinder of the right damper at a position higher than the second right arm, and
the hydraulic fluid channel is connected to the cylinder of the left damper at a position higher than the second left arm.

* * * * *